(12) United States Patent
Suhara

(10) Patent No.: US 8,561,920 B2
(45) Date of Patent: Oct. 22, 2013

(54) VARIABLE NOZZLE, VARIABLE NOZZLE DEVICE, AND APPLYING DEVICE INCLUDING VARIABLE NOZZLE DEVICE

(75) Inventor: Nobuhisa Suhara, Shiga (JP)

(73) Assignee: Heishin Ltd, Hyogo (JP)

( * ) Notice: Subject to any disclaimer, the term of this patent is extended or adjusted under 35 U.S.C. 154(b) by 370 days.

(21) Appl. No.: 13/126,016

(22) PCT Filed: Oct. 7, 2009

(86) PCT No.: PCT/JP2009/005210
§ 371 (c)(1),
(2), (4) Date: May 4, 2011

(87) PCT Pub. No.: WO2010/050127
PCT Pub. Date: May 6, 2010

(65) Prior Publication Data
US 2011/0204102 A1 Aug. 25, 2011

(30) Foreign Application Priority Data
Oct. 31, 2008 (JP) .................................. 2008-281283

(51) Int. Cl.
B05B 1/16 (2006.01)
B05B 15/08 (2006.01)
B05B 15/10 (2006.01)
B05B 3/02 (2006.01)

(52) U.S. Cl.
USPC .............. 239/393; 239/392; 239/436; 901/43

(58) Field of Classification Search
USPC ................. 239/98, 390–394, 436, 442, 587.1, 239/587.2, 587.5, 695, 696; 901/41, 43
See application file for complete search history.

(56) References Cited

U.S. PATENT DOCUMENTS 1,554,521 A * 9/1925 Reece ............................ 239/394
3,779,533 A * 12/1973 Etter ............................. 239/394

(Continued)

FOREIGN PATENT DOCUMENTS

| JP | 8224510 A | 3/1996 |
| JP | 2006187715 | 7/2006 |
| JP | 2007190552 A | 8/2007 |

OTHER PUBLICATIONS

CD-ROM of the specification and drawings annexed to the request of Japanese Utillity Model Application No. 3405/1993 (Laid-open No. 57440/1994) (Kane Auto Works, Ltd.,), Aug. 9, 1994, entire text; fig. 1 to 3 (Family: none).

(Continued)

*Primary Examiner* — Darren W Gorman
(74) *Attorney, Agent, or Firm* — The Ollila Law Group LLC

(57) ABSTRACT

In the present invention, functions of both a nozzle change drive mechanism configured to move a desired one of a plurality of nozzles to an ejection position and a nozzle moving drive mechanism configured to move the desired nozzle to apply a fluid to an application surface are realized by the nozzle moving drive mechanism.
The present invention includes: a rotating portion (27) having first to third nozzles (23); a base portion (28) configured to support the rotating portion (27); a variable nozzle (22) configured to move a desired one (23) of the first to third nozzles to an ejection position (T) to eject a fluid, supplied from the base portion (28) side, from the desired nozzle; an engaging portion (47) provided at the rotating portion (27); and an engaged portion (48) provided at a mounting base (50), wherein the desired nozzle (23) is moved to the ejection position (T) by moving the base portion (28) by a robot arm with the engaging portion (47) engaging with the engaged portion (48).

11 Claims, 17 Drawing Sheets

(56) References Cited

U.S. PATENT DOCUMENTS

| | | | |
|---|---|---|---|
| 4,741,078 A * | 5/1988 | Kimura | 29/39 |
| 5,833,147 A * | 11/1998 | Fuhlbrigge | 239/587.5 |
| 6,053,434 A * | 4/2000 | Filipsson | 239/587.1 |
| 6,749,134 B2 * | 6/2004 | Arenson et al. | 239/393 |
| 2002/0104900 A1 * | 8/2002 | Borcea et al. | 239/390 |
| 2009/0194922 A1 * | 8/2009 | Lin et al. | 269/55 |

OTHER PUBLICATIONS

Microfilm of the specification and drawings annexed to the request of Japanese Utility Model Application No. 201311/1982 (Laid-open No. 102170/1984) (Hachijo Kogyo Kabushiki Kaisha), Jul. 10, 1984, entire text; fig. 1 to 8 (Family: none).

* cited by examiner

VARIABLE NOZZLE, VARIABLE NOZZLE DEVICE, AND APPLYING DEVICE INCLUDING VARIABLE NOZZLE DEVICE

TECHNICAL FIELD

The present invention relates to a variable nozzle and variable nozzle device, each including a plurality of nozzles and configured to move a desired one of the plurality of nozzles to an ejection position to eject a fluid from the desired nozzle, and an applying device including the variable nozzle device.

BACKGROUND ART

One example of a conventional applying device will be explained in reference to FIGS. 17(a) and 17(b) (see PTL 1, for example). An applying device 1 shown in FIG. 17(a) includes a plurality of nozzle attaching ports 2. The applying device 1 can move a desired one of the plurality of nozzle attaching ports 2 to a lower position (ejection position) shown in FIG. 17(a) to eject, for example, an adhesive from the nozzle attaching port 2 located at the ejection position. Nozzles (not shown) are respectively attached to the nozzle attaching ports 2.

FIG. 17(b) is a longitudinal sectional view showing an internal structure of the applying device 1. The adhesive (not shown) stored in a syringe 3 shown in FIG. 17(b) flows through a fixed communication passage 4, an inflow hole 5, and a rotating communication passage 6 to be ejected from the nozzle attaching port 2 located at the ejection position.

Next, to eject the adhesive from the nozzle attaching port 2 different from the nozzle attaching port 2 located at the ejection position, a drive motor 7 shown in FIG. 17(a) is driven to move the desired nozzle attaching port 2 to the ejection position (lower position). In this state, by supplying the adhesive in the syringe 3 from the syringe 3, the adhesive flows through the fixed communication passage 4, the inflow hole 5, and the rotating communication passage 6 to be ejected from the nozzle attaching port 2 located at the ejection position.

Next, a nozzle change drive mechanism 8 configured to move the nozzle attaching port 2 to the ejection position will be explained. As shown in FIG. 17(a), the nozzle change drive mechanism 8 includes the drive motor 7, a driving timing pulley 9, a timing belt 10, a driven timing pulley 11, and a driven shaft 12. When the drive motor 7 drives, a driving shaft rotates, and the rotation of the driving shaft is transferred through the driving timing pulley 9, the timing belt 10, the driven timing pulley 11, and the driven shaft 12 to a rotary nozzle 13. Thus, the rotary nozzle 13 rotates.

As shown in FIG. 17(b), the rotary nozzle 13 is rotatably attached to a rotary base 15 via a bearing 14, and four nozzle attaching ports 2 are provided on an outer peripheral surface of the rotary nozzle 13 at even intervals. Therefore, the desired nozzle attaching port 2 can be moved to the ejection position (lower position) by rotating the rotary nozzle 13, and the adhesive can be ejected from the desired nozzle attaching port 2.

Although not shown, ejection ports of the nozzles attached to the remaining three nozzle attaching ports 2 which are not located at the ejection position are closed by shielding plates, so that the adhesive is not ejected from those ports 2.

CITATION LIST

Patent Literature

PTL 1: Japanese Laid-Open Patent Application Publication No. 2006-187715

SUMMARY OF INVENTION

Technical Problem

When using the conventional applying device 1 shown in FIGS. 17(a) and 17(b), the applying device 1 is attached to a nozzle moving drive mechanism (not shown), such as a robot arm, and the nozzle moving drive mechanism causes the desired nozzle, located at a predetermined ejection position, to move along an application surface to apply the fluid, ejected from the desired nozzle, to the application surface. In this case, both the nozzle change drive mechanism 8 configured to move the desired nozzle to the ejection position and the nozzle moving drive mechanism (not shown) configured to move the desired nozzle to apply the fluid to the application surface are necessary. Therefore, the size of the entire device increases, and the cost also increases.

The present invention was made to solve the above problems, and an object of the present invention is to provide a variable nozzle and variable nozzle device, each configured such that functions of both a nozzle change drive mechanism configured to move a desired one of a plurality of nozzles to an ejection position and a nozzle moving drive mechanism configured to move the desired nozzle to apply a fluid to an application surface are realized by the nozzle moving drive mechanism, and an applying device including the variable nozzle device.

Solution to Problem

A variable nozzle device according to a first aspect of the present invention includes: a variable nozzle including a rotating portion to which a plurality of nozzles are attached and a base portion configured to rotatably support the rotating portion, the variable nozzle being capable of moving a desired one of the plurality of nozzles to a predetermined ejection position to eject a fluid from the desired nozzle, the fluid being supplied from a fluid supply port of the base portion; an engaging portion provided at the rotating portion; an engaged portion provided at a fixed portion to engage with and disengage from the engaging portion, wherein the desired nozzle is moved to the ejection position by moving the base portion with the engaging portion engaging with the engaged portion.

The variable nozzle device according to the first aspect of the present invention can be used by attaching the base portion of the variable nozzle to a nozzle moving drive mechanism, such as a robot arm. When using the variable nozzle device in the above state, the base portion is circularly moved about the engaged portion by the nozzle moving drive mechanism in a state where the engaging portion provided at the rotating portion engages with the engaged portion provided at the fixed portion. With this, the desired one of the plurality of nozzles can be moved to the predetermined ejection position, and the fluid supplied from the fluid supply port can be ejected from the desired nozzle located at the ejection position.

In the variable nozzle device according to a second aspect of the present invention, a central axis of an ejection port of the nozzle located at the ejection position and a central axis of the fluid supply port may be positioned on the same straight line or on substantially the same straight line.

With this, when the variable nozzle is attached to the nozzle moving drive mechanism, such as the robot arm, and the nozzle located at the predetermined ejection position is moved along a defined route of the application surface to apply the fluid to a defined position of the application surface, and even if a large number of variable nozzles having different shapes are provided, it is unnecessary to produce a program for each of the variable nozzles having different shapes, the program causing the nozzle moving drive mechanism (robot) to operate. The program for causing the robot to operate may be produced based on the central axis of the fluid supply port. Thus, the program can be produced easily. Of course, the program can also be easily produced by teaching.

In the variable nozzle device according to a third aspect of the present invention, a communication passage formed to cause an inflow opening of the nozzle located on the ejection position and the fluid supply port to be communicated with each other may be formed on a straight line or on a substantially straight line.

With this, for example, when throwing away the fluid in the communication passage to wash the variable nozzle included in the variable nozzle device, the amount of fluid thrown away can be reduced, which is economical. Since channel resistance of the communication passage can be lowered, a pump configured to cause the fluid to be ejected from the nozzle located at the ejection position can be reduced in size. In addition, since the communication passage can be reduced in length, it is possible to reduce a gap between an operation timing of the pump and an ejection timing of the fluid ejected from the nozzle. With this, flow rate control can be accurately carried out, and the fluid can be accurately applied to a defined application position.

In the variable nozzle device according to a fourth aspect of the present invention, the base portion may include an outer peripheral surface having a substantially cylindrical shape or an annular outer side surface having a substantially truncated cone shape, an inner peripheral surface having a substantially cylindrical shape or an inner side surface having a substantially truncated cone shape may be provided on the rotating portion so as to be rotatable and opposed to the outer peripheral surface or the outer side surface, and a communication passage formed to cause an inflow opening of the nozzle located at the ejection position and the fluid supply port to be communicated with each other may extend through the outer peripheral surface of the base portion and the inner peripheral surface of the rotating portion, or the communication passage may extend through the outer side surface of the base portion and the inner side surface of the rotating portion.

As above, in a case where the communication passage extends through the outer peripheral surface formed on the base portion and having a substantially cylindrical shape and the inner peripheral surface formed on the rotating portion and having a substantially cylindrical shape, the pressure of the fluid in the communication passage is applied to the inner peripheral surface of the rotating portion in a radially outward direction. Therefore, sealing performance of the gap between the outer peripheral surface of the base portion and the inner peripheral surface of the rotating portion does not deteriorate by the pressure of the fluid. Thus, the sealing performance can be surely secured. On this account, the leakage of the fluid can be easily prevented.

In a case where the communication passage is formed to extend through the annular outer side surface formed on the base portion and having a substantially truncated cone shape and the inner side surface formed on the rotating portion and having a substantially truncated cone shape, a design for providing the outer side surface of the base portion and the inner side surface of the rotating portion between the inflow opening of the nozzle located at the ejection position and the fluid supply port becomes easy. With this, the central axis of the ejection port of the nozzle located at the ejection position and the central axis of the fluid supply port can be easily positioned on the same straight line or on substantially the same straight line, and the communication passage can be easily formed on a straight line or on a substantially straight line.

In the variable nozzle device according to a fifth aspect of the present invention, the engaging portion may be a convex portion or a concave portion, and the engaged portion may be a concave portion or a convex portion which is able to engage with and disengage from the engaging portion that is the convex portion or the concave portion.

As above, by forming the engaging portion as the convex portion or the concave portion and forming the engaged portion as the concave portion or the convex portion, the engaging portion can easily and surely engage with and disengage from the engaged portion by using the nozzle moving drive mechanism, such as the robot arm.

The variable nozzle device according to a sixth aspect of the present invention may further include a lock mechanism configured to unlockably lock rotation of the rotating portion with respect to the base portion when each of the plurality of nozzles is moved to the ejection position, wherein the lock mechanism may include: a plurality of lock concave portions formed at one of the rotating portion and the base portion; a lock ball provided at the other one of the rotating portion and the base portion to engage with each of the lock concave portions; and a spring portion configured to bias the lock ball toward the lock concave portion.

In accordance with the lock mechanism, when the spring portion biases the lock ball toward the lock concave portion, and the lock ball engages with any one of the lock concave portions, the lock ball can stop relative rotation of the rotating portion with respect to the base portion. Thus, each of the nozzles can be accurately positioned and stopped at the predetermined ejection position, and the nozzle located at the predetermined ejection position can be unlockably stopped so as not to be displaced from the predetermined ejection position. By rotating the rotating portion against the force of the spring portion, the lock ball can be detached from the lock concave portion. In this state, the rotating portion can be easily rotated, and the other desired nozzle can be moved to the ejection position and locked.

An applying device according to a seventh aspect of the present invention includes: the variable nozzle device of the present invention; a pump configured to supply the fluid to the fluid supply port of the variable nozzle; and a robot arm to which the pump and the variable nozzle are attached.

To apply the fluid to the predetermined application surface by using the applying device according to the seventh aspect of the present invention, first, a desired one of the plurality of nozzles included in the variable nozzle is moved to the ejection position. The desired nozzle can be moved to the ejection position by operating the robot arm based on a program. Next, the desired nozzle is moved to a starting point of the application surface by operating the robot arm. Then, the pump is driven, and the variable nozzle is moved by the robot arm. Thus, the fluid can be applied to the predetermined application surface.

Moreover, since the pump is attached to the robot arm, an outflow opening of the pump can be provided close to the variable nozzle. With this, it is possible to reduce a gap between the operation timing of the pump and the ejection timing of the fluid ejected from the nozzle located at the ejection position. Therefore, the flow rate control can be accurately carried out, and the fluid can be accurately applied to a defined application position.

The variable nozzle according to an eighth aspect of the present invention includes: a rotating portion to which a plurality of nozzles are attached; a base main body configured to rotatably support the rotating portion; and a base frame configured to rotatably support the base main body, wherein: the rotating portion is able to move a desired one of the plurality of nozzles to a desired ejection position to eject a fluid from the desired nozzle, the fluid being supplied from a fluid supply port of the base frame; and the base main body is able to move a communication passage to a predetermined communication position to cause a fluid supply port of the base frame and the desired nozzle located at the desired ejection position to be communicated with each other, the communication passage being formed on the base main body.

In accordance with the variable nozzle according to the eighth aspect of the present invention, a desired one of the plurality of nozzles can be caused to face in a desired ejection direction, and the fluid can be ejected from this nozzle. To be specific, the desired one of the plurality of nozzles can be caused to face in the desired ejection direction by rotating the rotating portion. By moving the communication passage formed on the base main body to the predetermined communication position, the fluid supplied from the fluid supply port of the base frame can be ejected from the desired nozzle facing in the desired ejection direction through the communication passage.

Another variable nozzle device according to a ninth aspect of the present invention includes: the variable nozzle according to the eighth aspect of the present invention; a first engaging portion provided at the rotating portion; a second engaging portion provided at the base main body; and an engaged portion provided at a fixed portion to engage with and disengage from each of the first engaging portion and the second engaging portion, wherein: the desired nozzle is able to be moved to the desired ejection position by moving the base main body with the first engaging portion engaging with the engaged portion; and the communication passage is able to be moved to a desired communication position by moving the base main body with the second engaging portion engaging with the engaged portion.

The variable nozzle device according to the ninth aspect of the present invention can be used by attaching the base frame of the variable nozzle to the nozzle moving drive mechanism, such as the robot arm. When using the variable nozzle device in the above state, the base main body is circularly moved about the engaged portion by the nozzle moving drive mechanism in a state where the first engaging portion provided at the rotating portion engages with the engaged portion provided at the fixed portion. With this, the desired one of the plurality of nozzles can be moved to the desired ejection position.

Then, the base main body is circularly moved about the engaged portion by the nozzle moving drive mechanism in a state where the second engaging portion provided at the base main body engages with the engaged portion provided at the fixed portion. With this, the communication passage formed on the base main body can be moved to the desired communication position, and the fluid supply port of the base frame and the desired nozzle located at the desired ejection position can be communicated with each other.

Thus, the desired one of the plurality of nozzles can be caused to face in the desired ejection direction, and the fluid can be ejected from the nozzle.

The variable nozzle device according to a tenth aspect of the present invention is configured such that in the variable nozzle device according to the ninth aspect of the present invention, the engaged portion is constituted by one engaged portion configured to engage with and disengage from each of the first engaging portion and the second engaging portion, or the engaged portion is constituted by two engaged portions that are a first engaged portion configured to engage with and disengage from the first engaging portion and a second engaged portion configured to engage with and disengage from the second engaging portion.

As above, the first engaging portion and the second engaging portion can be operated by one engaged portion, or the first engaging portion and the second engaging portion can be operated by the first and second engaged portions, respectively.

An applying device according to an eleventh aspect of the present invention includes: the variable nozzle device according to the ninth aspect or tenth aspect of the present invention; a pump configured to supply the fluid to the fluid supply port of the variable nozzle; and a robot arm to which the pump and the variable nozzle are attached.

In accordance with the applying device according to the eleventh aspect of the present invention, the desired one of the plurality of nozzles can be caused to face in the desired ejection direction by the operation of the robot arm, and the fluid can be ejected from the nozzle. Other than this, the applying device herein acts in the same manner as the above applying device.

ADVANTAGEOUS EFFECTS OF INVENTION

The variable nozzle device according to the present invention is configured such that: for example, the base portion of the variable nozzle is attached to the nozzle moving drive mechanism, such as the robot arm; and the nozzle moving drive mechanism can be operated to move the desired one of the plurality of nozzles to the predetermined ejection position. Therefore, when the nozzle moving drive mechanism is used in the applying device configured to move the desired nozzle located at the predetermined ejection position along the application surface to apply the fluid ejected from the desired nozzle to the application surface, functions of both the nozzle moving drive mechanism and the nozzle change drive mechanism configured to move the desired nozzle to the ejection position can be realized by the nozzle moving drive mechanism. Therefore, the size of the entire applying device can be reduced, and the cost can be reduced.

The variable nozzle according to the present invention is configured such that the desired one of the plurality of nozzles can be caused to face in the desired ejection direction, and the fluid can be ejected from this nozzle. Therefore, the fluid can be ejected to various different portions, such as the upper surface, lower surface, side surface, and the like of the component of the automobile.

BRIEF DESCRIPTION OF DRAWINGS

FIG. 2(a) is an enlarged front view, and FIG. 2(b) is a partial cross-sectional enlarged side view.

FIG. 3(a) is an enlarged front view of a variable nozzle, FIG. 3(b) is an enlarged cross-sectional view of the variable nozzle device, and FIG. 3(c) is an enlarged rear view of the variable nozzle.

FIG. 4(a) is a front view showing that the variable nozzle is located at a raised position with respect to an engaged member. FIG. 4(b) is a partial cross-sectional side view of FIG. 4(a).

FIG. 5(a) is a front view showing that the variable nozzle is located at a lowered position with respect to the engaged member. FIG. 5(b) is a partial cross-sectional side view of FIG. 5(a).

FIG. 6(a) is a front view showing that an engaging portion of the variable nozzle device engages with an engaged portion of the variable nozzle device. FIG. 6(b) is a partial cross-sectional side view of FIG. 6(a).

FIG. 7(a) is a front view showing that the engaging portion of the variable nozzle device engages with the engaged portion of the variable nozzle device. FIGS. 7(b) and 7(c) are front views each showing that a base portion is rotated and moved from the state shown in FIG. 7(a).

FIGS. 8(a) and 8(b) are front views each showing that the base portion is rotated and moved from the state shown in FIG. 7(a). FIG. 8(c) is a front view showing that the nozzle is changed.

FIG. 9(a) is an enlarged front view of the variable nozzle. FIG. 9(b) is an enlarged cross-sectional view of the variable nozzle device. FIG. 9(c) is an enlarged bottom view of the variable nozzle.

FIG. 15(a) is an enlarged front view, and FIG. 15(b) is an enlarged rear view.

FIG. 17(a) is a perspective view, and FIG. 17(b) is a longitudinal sectional view showing an internal structure.

DESCRIPTION OF EMBODIMENTS

Figure 1:
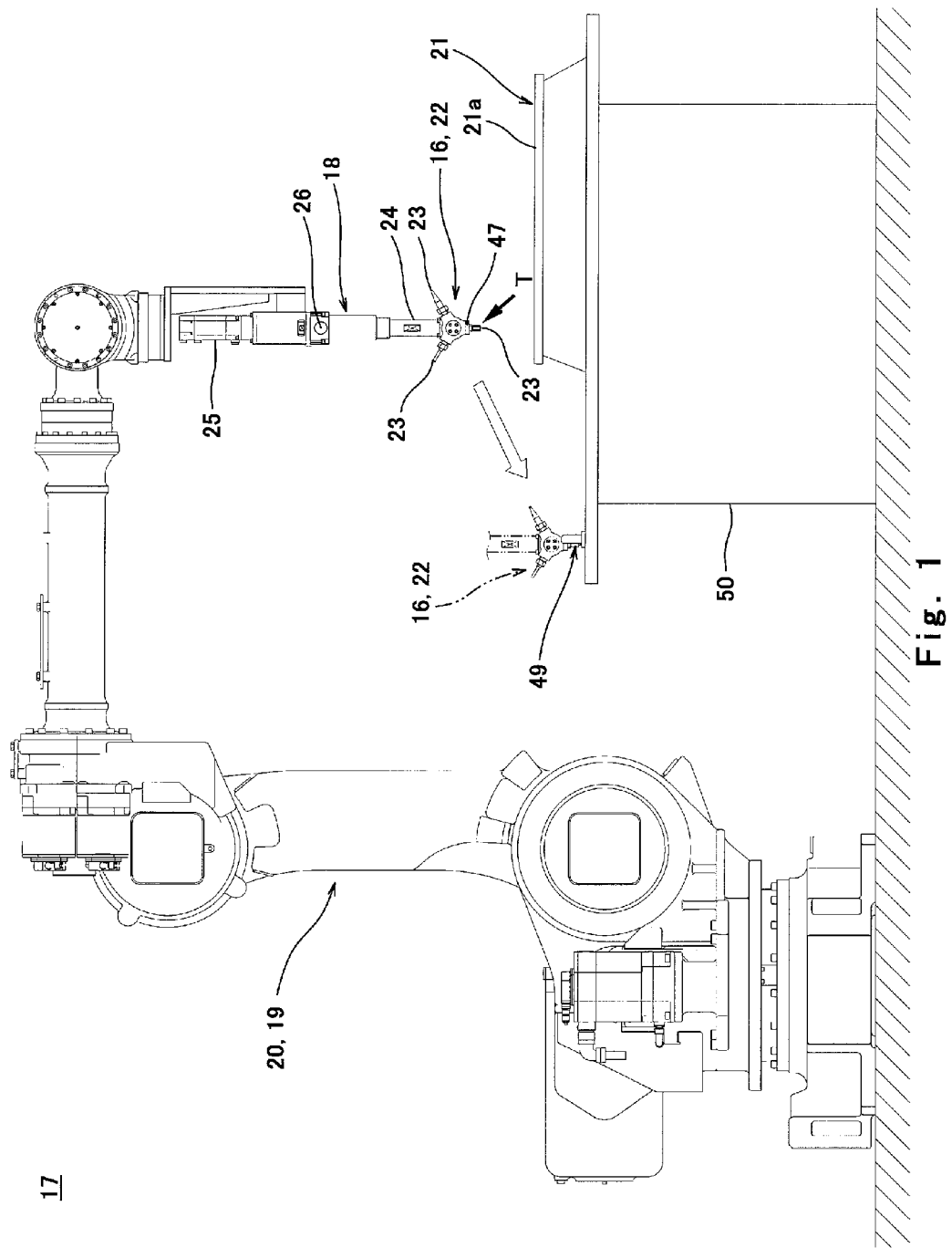
FIG. 1 is a front view showing an applying device including a variable nozzle device according to Embodiment 1 of the present invention.
Figure 2:
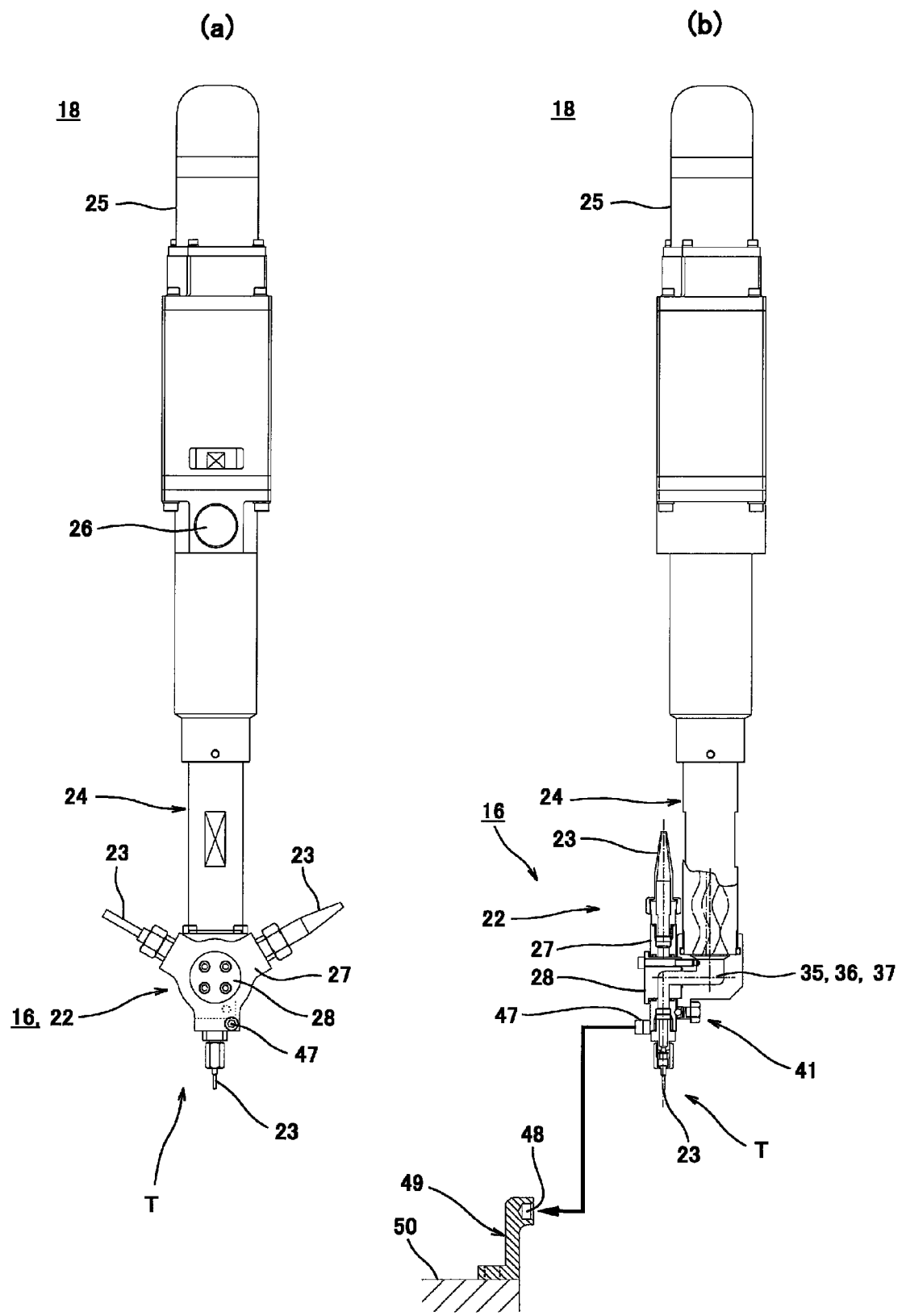
FIG. 2 are diagrams each showing an ejecting device including the variable nozzle device according to Embodiment 1.

Hereinafter, Embodiment 1 of a variable nozzle device 16 according to the present invention and an applying device 17 including the variable nozzle device 16 will be explained in reference to FIGS. 1 to 8. For example, as shown in FIG. 1, the applying device 17 is configured by attaching an ejecting device 18 to a tip end portion of a multijoint robot arm 19. A robot 20 can use the ejecting device 18 to apply fluids, such as a damping agent, a sealing agent, and an adhesive, to a component 21 of an automobile for example or fill fluids (including a flowable material), such as grease, in the component 21 of the automobile for example.

Then, when the applying device 17 applies the fluid, such as the damping agent, to the component 21 of the automobile for example, the robot arm 19 shown in FIG. 1 causes the ejecting device 18 to move along a predetermined route of an application surface 21a of the component 21. Thus, the fluid ejected from the ejecting device 18 can be automatically applied to the application surface 21a.

Moreover, by the operation of the robot arm 19, the applying device 17 can operate a variable nozzle 22 included in the ejecting device 18 attached to the tip end portion of the robot arm 19. By the operation of the applying device 17, a desired one of first to third nozzles 23 provided at the variable nozzle 22 can be moved to a predetermined ejection position T, and the fluid can be ejected from the nozzle 23 located at the ejection position T.

As shown in FIGS. 2(a) and 2(b), the ejecting device 18 includes an ejection pump 24, a rotary driving portion (an electric motor, such as a servo motor) 25 configured to drive the ejection pump 24, and the variable nozzle 22. For example, a transfer pipe (not shown) is connected to a suction port 26 of the ejection pump 24, and the fluid, such as the damping agent, is supplied through the transfer pipe to the suction port 26 of the ejection pump 24. By the operation of the ejection pump 24, the fluid can be ejected from the nozzle 23 located at the predetermined ejection position T.

As shown in FIG. 3(b), the ejection pump 24 is, for example, a vertical uniaxial eccentric screw pump and includes a rotor 24a and a stator 24b. The rotor 24a is formed in an external screw shape and is rotatably attached to the stator 24b having an inner hole 24c formed in an internal screw shape. An upper end of the rotor 24a is coupled to a rotating shaft of the rotary driving portion 25 via a connecting rod, a reducer, and the like, not shown.

Figure 3:
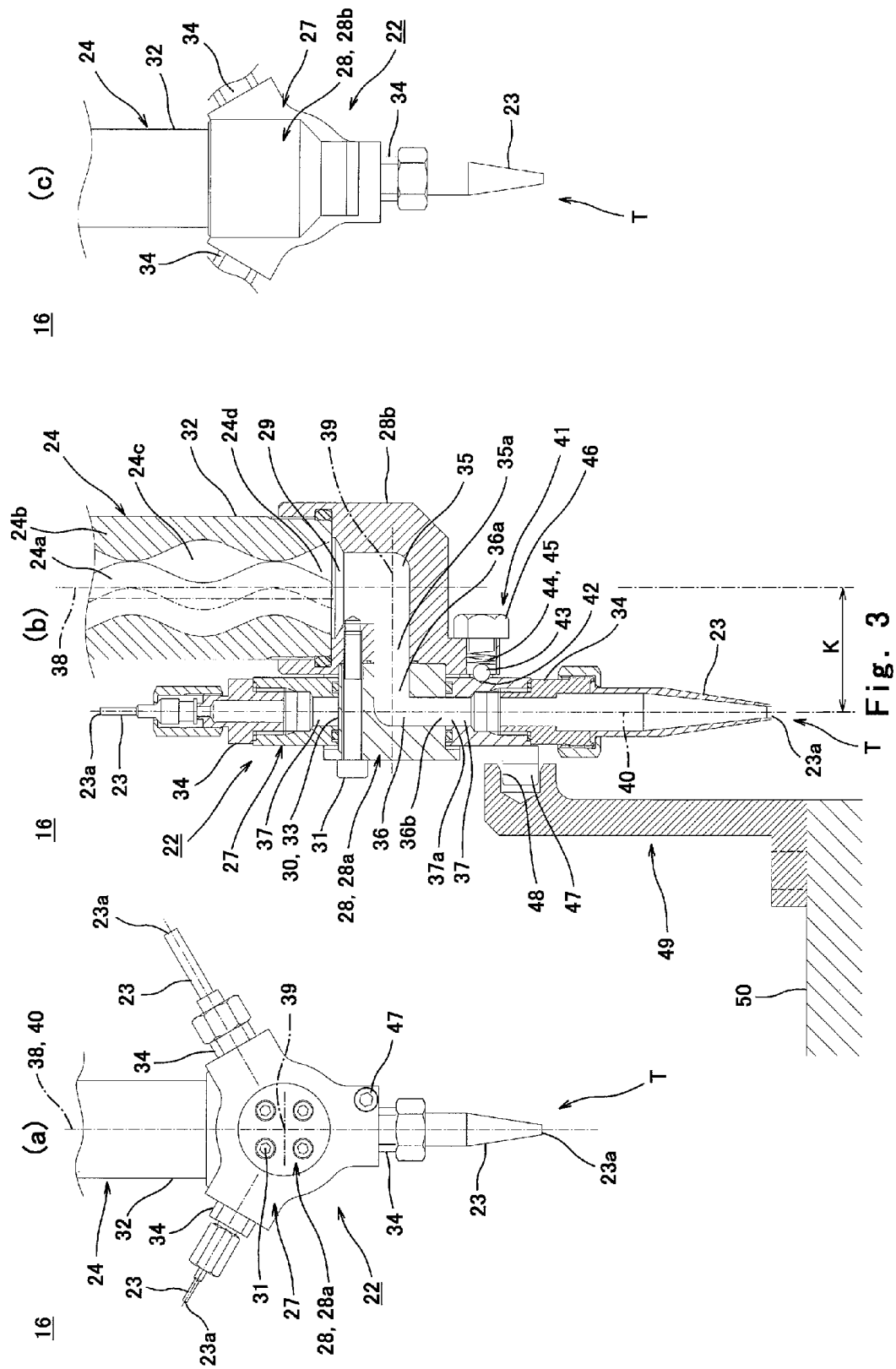
FIG. 3 are diagrams each showing the variable nozzle device according to Embodiment 1.
Figure 4:
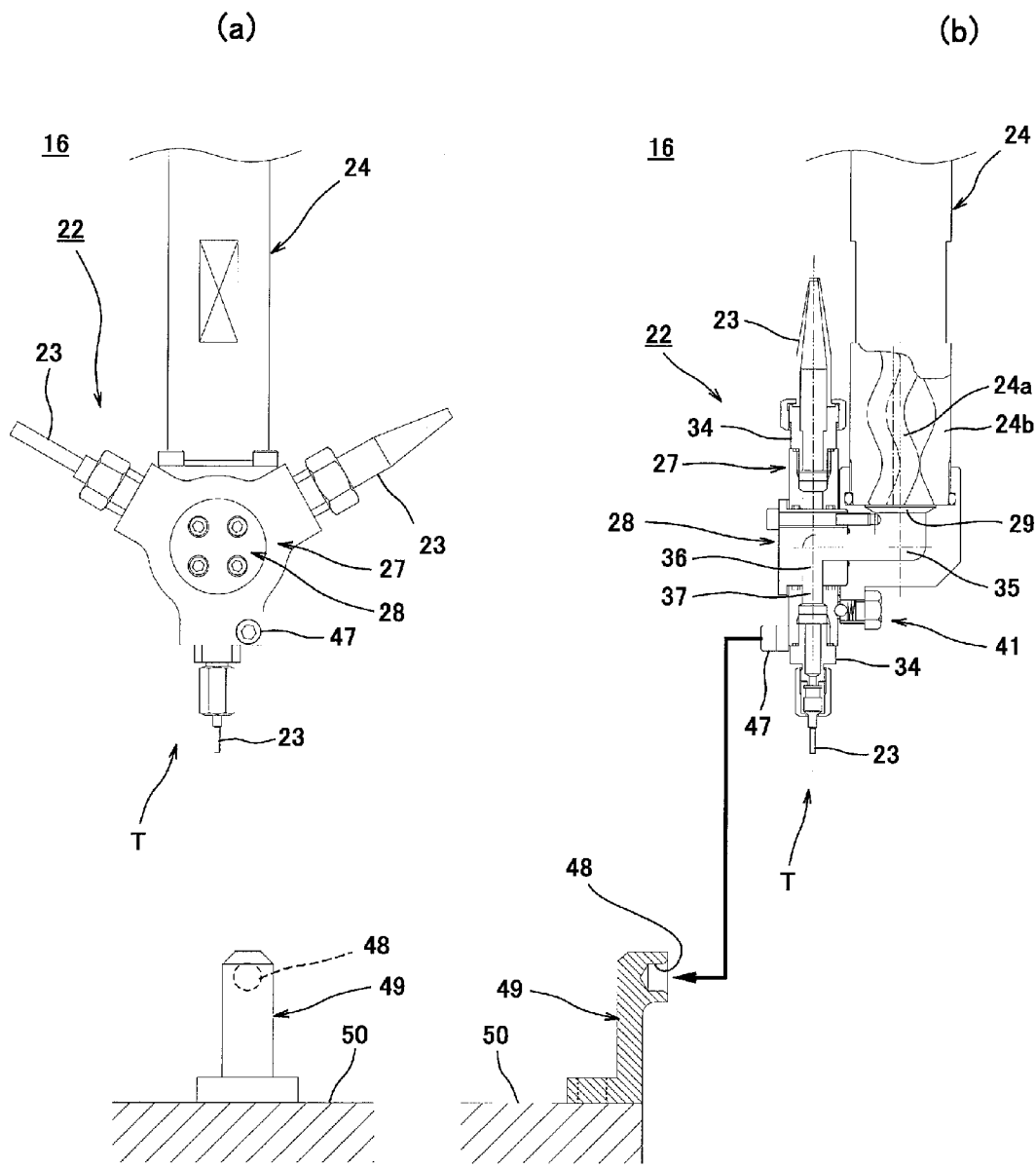
FIG. 4 are diagrams for explaining a procedure of changing the nozzle by using the variable nozzle device according to Embodiment 1.
Figure 5:
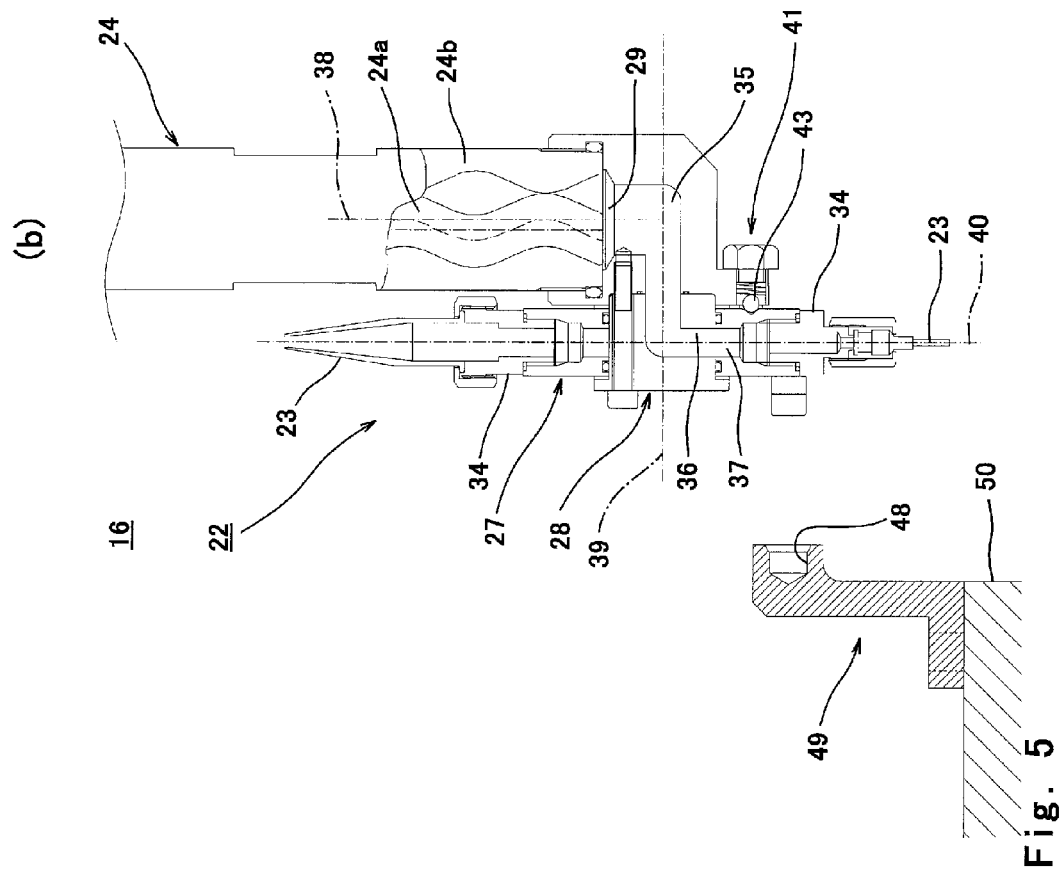
FIG. 5 are diagrams for explaining a procedure of changing the nozzle by using the variable nozzle device according to Embodiment 1.
Figure 5:
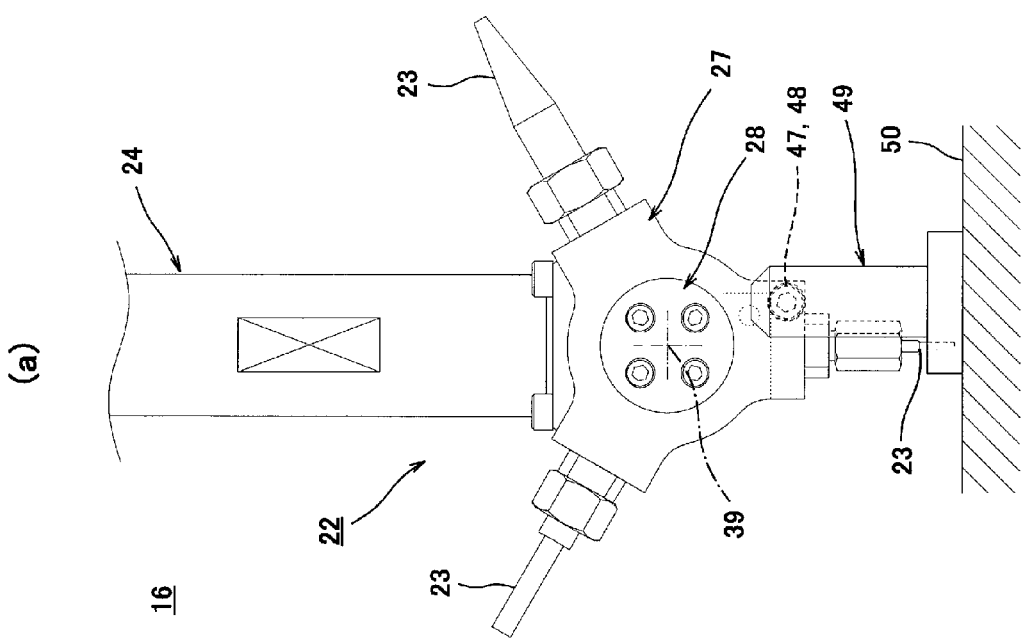
Figure 6:
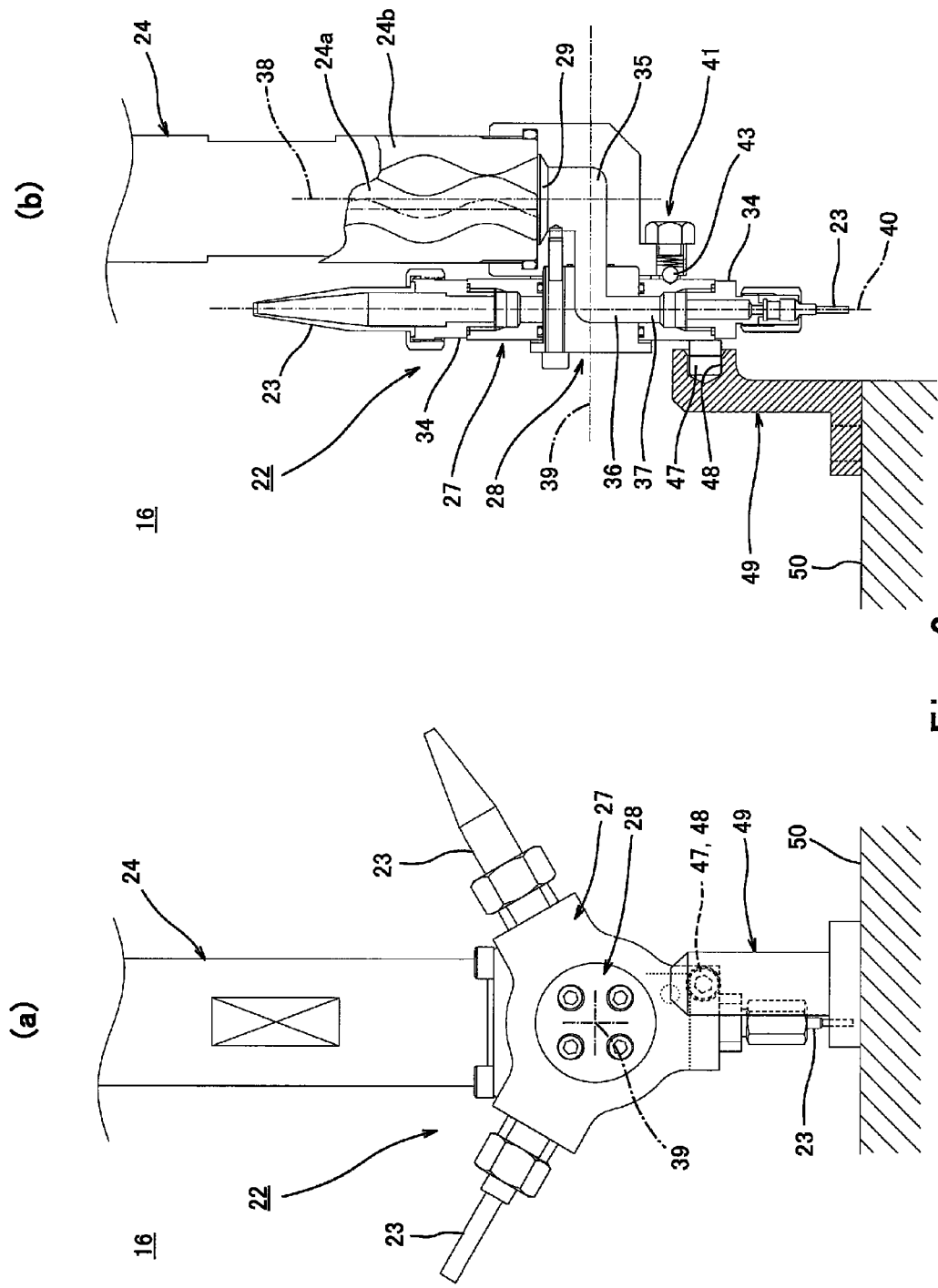
FIG. 6 are diagrams for explaining a procedure of changing the nozzle by using the variable nozzle device according to Embodiment 1.

As shown in FIGS. 3(a), 3(b), and 3(c), the variable nozzle 22 includes a rotating portion 27 and a base portion 28 rotatably supporting the rotating portion 27. For example, three nozzles that are the first, second, and third nozzles 23 are attached to the rotating portion 27. In order to eject the fluid, supplied from a fluid supply port 29 of the base portion 28, from a desired one (for example, the second nozzle 23 shown in FIG. 3) of the first to third nozzles 23, the variable nozzle 22 can rotate to move the desired nozzle 23 to a predetermined ejection position T (lower position).

The reason why the variable nozzle 22 includes the first to third nozzles 23 is because, for example, when applying the fluid, such as the damping agent, in a linear shape to the component 21, the thickness of the applied line can be changed among a thick line, a medium line, and a thin line based on a predefined standard. The applied lines that are the thick line, the medium line, and the thin line are formed by the fluid ejected from the corresponding first to third nozzles 23.

As shown in FIGS. 3(a) and 3(b), the base portion 28 included in the variable nozzle 22 includes a base main body 28a and a joint block 28b. The base main body 28a has a substantially columnar shape and includes an outer peripheral surface 30 having a substantially cylindrical shape. The base main body 28a is fixedly fastened to the joint block 28b with a bolt 31, and the joint block 28b threadedly engages with an outflow opening portion 32 of the ejection pump 24.

Moreover, as shown in FIGS. 3(a) and 3(b), the shape of the rotating portion 27 included in the variable nozzle 22 in a front view is a substantially triangular and annular shape. The base main body 28a fits a center portion of the rotating portion 27. The rotating portion 27 is rotatable with respect to the base main body 28a. An inner peripheral surface 33 having a substantially cylindrical shape is formed at the center portion of the annular rotating portion 27. The inner peripheral surface 33 rotatably fits an outer peripheral surface 30 of the base main body 28a.

The first to third nozzles 23 formed such that diameters of ejection ports 23a thereof are different from one another are respectively attached to three top portions of the rotating portion 27 having the substantially triangular shape. The diameters of the ejection ports 23a of the three nozzles 23 are respectively large, medium, and small. The nozzles 23 respectively and threadedly engage with nozzle attaching ports of the rotating portion 27 via adapters 34.

Moreover, as shown in FIG. 3(b), a first communication passage 35 is formed on the joint block 28b, a second communication passage 36 is formed on the base main body 28a, and three third communication passages 37 are formed on the rotating portion 27. The first and second communication passages 35 and 36 are L-shaped channels, and the third communication passages 37 are linear channels.

As shown in FIG. 3(b), the first communication passage 35 includes the fluid supply port 29. The fluid supply port 29 is communicated with an outflow opening 24d formed at a lower end portion of the inner hole 24c of the stator 24b. A central axis 38 of the fluid supply port 29 and a central axis 38 of the outflow opening 24d coincide with each other. An outflow opening 35a of the first communication passage 35 is communicated with an inflow opening 36a of the second communication passage 36. A central axis 39 of the outflow opening 35a and a central axis 39 of the inflow opening 36a coincide with each other. In addition, the central axis 39 of the inflow opening 36a coincides with a central axis of the base main body 28a, and the central axis 39 of the base main body 28a is a central axis of the rotation of the rotating portion 27. As shown in FIG. 3(b), an outflow opening 36b of the second communication passage 36 extends in a vertically lower direction and opens on the outer peripheral surface 30 of the base main body 28a.

Further, as shown in FIG. 3(b), for example, when the second nozzle 23 is moved to the lower position (ejection position T) facing in the vertically lower direction, an inflow opening 37a of the third communication passage 37 communicated with the second nozzle 23 is communicated with the outflow opening 36b of the second communication passage 36. The inflow opening 37a of the third communication passage 37 is formed on the inner peripheral surface 33 of the rotating portion 27. A central axis 40 of the outflow opening 36b of the second communication passage 36 and a central axis 40 of the inflow opening 37a of the third communication passage 37 coincide with each other. In addition, the central axis 40 coincides with each of a central axis of an adapter hole formed on the adapter 34 and a central axis of a nozzle hole formed on the second nozzle 23.

Similarly, although not shown, when each of the first and third nozzles 23 is moved to the ejection position T facing in the vertically lower direction, each of the inflow openings 37a (on the rotating portion 27 side) of the third communication passages 37 respectively communicated with the first and third nozzles 23 is communicated with the outflow opening 36b (on the base main body 28a side) of the second communication passage 36. The inflow openings 37a of the third communication passages 37 are formed on the inner peripheral surface 33 of the rotating portion 27. When each of the first and third nozzles 23 is moved to the ejection position T, the central axis 40 of the outflow opening 36b of the second communication passage 36 and the central axis 40 of the inflow opening 37a of the third communication passage 37 coincide with each other. In addition, the central axis 40 coincides with each of a central axis of the adapter hole formed on the adapter 34 and central axes of the nozzle holes formed on the first and third nozzles 23.

Next, a lock mechanism 41 will be explained in reference to FIG. 3(b). The lock mechanism 41 is a mechanism configured to unlockably lock the rotation of the rotating portion 27 with respect to the base portion 28 when each of the first to third nozzles 23 is moved to the ejection position T as shown in FIG. 3(b). The lock mechanism 41 includes three lock concave portions 42, a lock ball 43, and a spring portion 44. In FIG. 3(b), the second nozzle 23 is located at the ejection position T, and the ejection position T denotes a position where the nozzle 23 faces in the vertically lower direction.

As shown in FIG. 3(b), three lock concave portions 42 are formed on a surface of the rotating portion 27, the surface facing the joint block 28b. Each of the lock concave portions 42 is formed to have such a size and shape (conical shape) that the lock ball 43 can engage with and disengage from the lock concave portion 42. Further, each of three lock concave portions 42 are formed at such a position that when each of the first to third nozzles 23 is moved to the ejection position T, the nozzle 23 can be locked at the ejection position T. The lock ball 43 is stored in a storage hole 45 formed on the joint block 28b.

A spring portion 44 biases the lock ball 43 toward the lock concave portion 42 and is stored in the storage hole 45. Repulsive force of biasing force of the spring portion 44 is stopped by a bolt 46. The bolt 46 fixedly and threadedly engages with the storage hole 45.

In accordance with the lock mechanism 41, when the spring portion 44 biases the lock ball 43 toward the lock concave portion 42, and the lock ball 43 engages with any one of the lock concave portions 42, the lock ball 43 can stop relative rotation of the rotating portion 27 with respect to the base portion 28. Thus, each of the first to third nozzles 23 can be accurately positioned and stopped at the predetermined ejection position T, and the nozzle 23 located at the ejection position T can be unlockably stopped so as not to be displaced from the ejection position T. By rotating the rotating portion 27 against the force of the spring portion 44, the lock ball 43 can be detached from the lock concave portion 42. In this state, the rotating portion 27 can be easily rotated, and the other desired nozzle 23 can be moved to the ejection position T and locked.

The lock mechanism 41 is configured as shown in FIG. 3(b). However, instead of this configuration, the lock concave portion 42 may be formed on the joint block 28b, the storage hole 45 may be formed on the rotating portion 27, and the lock ball 43, the spring portion 44, and the bolt 46 may be provided in the storage hole 45.

Next, an engaging portion 47 and engaged portion 48 for moving a desired one of the first to third nozzles 23 provided at the variable nozzle 22 to the ejection position T will be explained in reference to FIGS. 3(a) and 3(b). The variable nozzle 22, the engaging portion 47, and the engaged portion 48 constitute the variable nozzle device 16.

As shown in FIGS. 3(a) and 3(b), the engaging portion 47 is a convex portion having a substantially columnar shape. The engaging portion 47 is provided on a portion of a front surface of the rotating portion 27, the portion being a portion to which the second nozzle 23 whose ejection port 23a has the medium diameter is attached. The engaging portion 47 is located at a position away from the central axis 39 of the rotation of the rotating portion 27.

As shown in FIG. 3(b), the engaged portion 48 is a concave portion having a substantially cylindrical shape. The engaged portion 48 is formed on a front surface portion of an upper end portion of the engaged member 49. The engaged portion 48 is formed to have such a size that the engaging portion 47 can engage with and disengage from the engaged portion 48. For example, as shown in FIG. 1, the engaged member 49 is attached to an upper surface of a mounting base (fixed portion) 50 on which, for example, the component 21 of the automobile to which the fluid, such as the damping agent, is applied is mounted.

As shown in FIG. 3(b), the engaging portion 47 is formed as the convex portion, and the engaged portion 48 is formed as the concave portion. However, instead of this, the engaging portion 47 may be formed as the concave portion, and the engaged portion 48 may be formed as the convex portion.

Next, a procedure of applying the fluid, such as the damping agent, to the surface of, for example, the component 21 of the automobile by using the applying device 17 configured as above and the actions of the applying device 17 will be explained. As shown in FIG. 1, the ejecting device 18 is attached to the tip end portion of the multijoint robot arm 19. The variable nozzle 22 is attached to the tip end portion (lower end portion) of the ejection pump 24 included in the ejecting device 18, and the third nozzle 23 whose ejection port 23a has the small diameter among the first to third nozzles 23 attached to the variable nozzle 22 is set at the ejection position T.

In this state, the robot arm 19 is operated by a program such that the third nozzle 23 located at the ejection position T is moved to a starting point of the application surface 21a. Then, the ejection pump 24 is driven, and the ejecting device 18 (variable nozzle 22) is moved by the robot arm 19. Thus, the fluid can be applied to the application surface 21a of the component 21 of the predetermined automobile by using the third nozzle 23. The applied line formed by the fluid ejected from the third nozzle 23 is the thin line.

The operation of the robot arm 19, the driving of the ejection pump 24, and the like are carried out by a preset program. This program is prestored in a storage portion of a calculating control portion, not shown.

Next, a procedure of forming the medium applied line by using the second nozzle 23 whose ejection port 23a has the medium diameter with respect to the component 21 of the automobile on which the thin applied line is formed by using the third nozzle 23 will be explained. To be specific, as shown in FIGS. 4(a) and 4(b), the third nozzle 23 of the variable nozzle 22 is located at the ejection position T. A procedure of moving the second nozzle 23 to the ejection position T as shown in FIG. 8(c) from this state will be explained.

First, the ejecting device 18 located at a raised position as shown in FIGS. 4(a) and 4(b) is moved to the lowered position as shown in FIGS. 5(a) and 5(b) by operating the robot arm 19. At this lowered position, the engaging portion 47 provided at the variable nozzle 22 is opposed to the engaged portion 48 of the engaged member 49 attached to the mounting base 50 with an interval between the engaging portion 47 and the engaged portion 48.

Next, as shown in FIGS. 6(a) and 6(b), by operating the robot arm 19, the ejecting device 18 located at the lowered position is moved forward. Thus, the engaging portion 47 provided at the variable nozzle 22 engages with the engaged portion 48 of the engaged member 49 attached to the mounting base 50.

As shown in FIGS. 7(a), 7(b), 7(c), 8(a), and 8(b), by operating the robot arm 19, the base portion 28 is moved along a circumference 70 in a clockwise direction by θ (=) 120°. A center of the circumference 70 is each of the engaging portion 47 and the engaged portion 48 engaging with each other, and a radius of the circumference 70 is a line connecting the center of the engaging portion 47 and the central axis 39 of the base main body 28a. With this, as shown in FIG. 8(c), the second nozzle 23 whose ejection port 23a has the medium diameter can be moved to the ejection position T.

In this state, the robot arm 19 is operated by the program such that the second nozzle 23 located at the ejection position T is moved to a next starting point of the application surface 21a. Then, the ejection pump 24 is driven, and the ejecting device 18 (variable nozzle 22) is moved by the robot arm 19. Thus, the fluid can be applied to the application surface 21a of the component 21 of the predetermined automobile by using the second nozzle 23. The applied line formed by the fluid ejected from the second nozzle 23 is the medium line. With this, the thin applied line and the medium applied line can be formed on the application surface 21a of the component 21.

As above, in accordance with the variable nozzle device 16 shown in FIGS. 3(a), 3(b), and 3(c), by moving a desired one of the first to third nozzles 23 to the ejection position T, for example, the applied lines that are the thick line, the medium line, and the thin line can be formed on the application surface 21a of the component 21 based on a predefined standard. Therefore, when forming the applied lines that are the thick line, the medium line, and the thin line, it is unnecessary for an operator to change the nozzle of the ejection pump 24 among three types of nozzles corresponding to the thicknesses of the applied lines. Thus, the efficiency of the application operation can be improved.

Therefore, in accordance with the applying device 17, the functions of both a nozzle change drive mechanism for moving the desired nozzle 23 to the ejection position T and a nozzle moving drive mechanism configured to move the desired nozzle 23 to apply the fluid to the application surface 21a can be realized by the robot arm 19 (nozzle moving drive mechanism). With this, the size of the entire applying device 17 can be reduced, and the cost can be reduced.

Moreover, as shown in FIG. 3(b), the second and third communication passages 36 and 37 are formed to extend through the outer peripheral surface 30 formed on the base main body 28a of the variable nozzle 22 and having a substantially cylindrical shape and the inner peripheral surface 33 formed on the rotating portion 27 to be opposed to the outer peripheral surface 30 and having a substantially cylindrical shape.

With this configuration, in the second and third communication passages 36 and 37, a portion (the outer peripheral surface 30 and the inner peripheral surface 33) to which the pressure of the fluid is applied is a circumferential surface. Therefore, the distribution of the internal pressure is not biased but uniform. On this account, sealing performance does not deteriorate and can be surely secured. Thus, the leakage of the fluid can be easily prevented.

Figure 7:
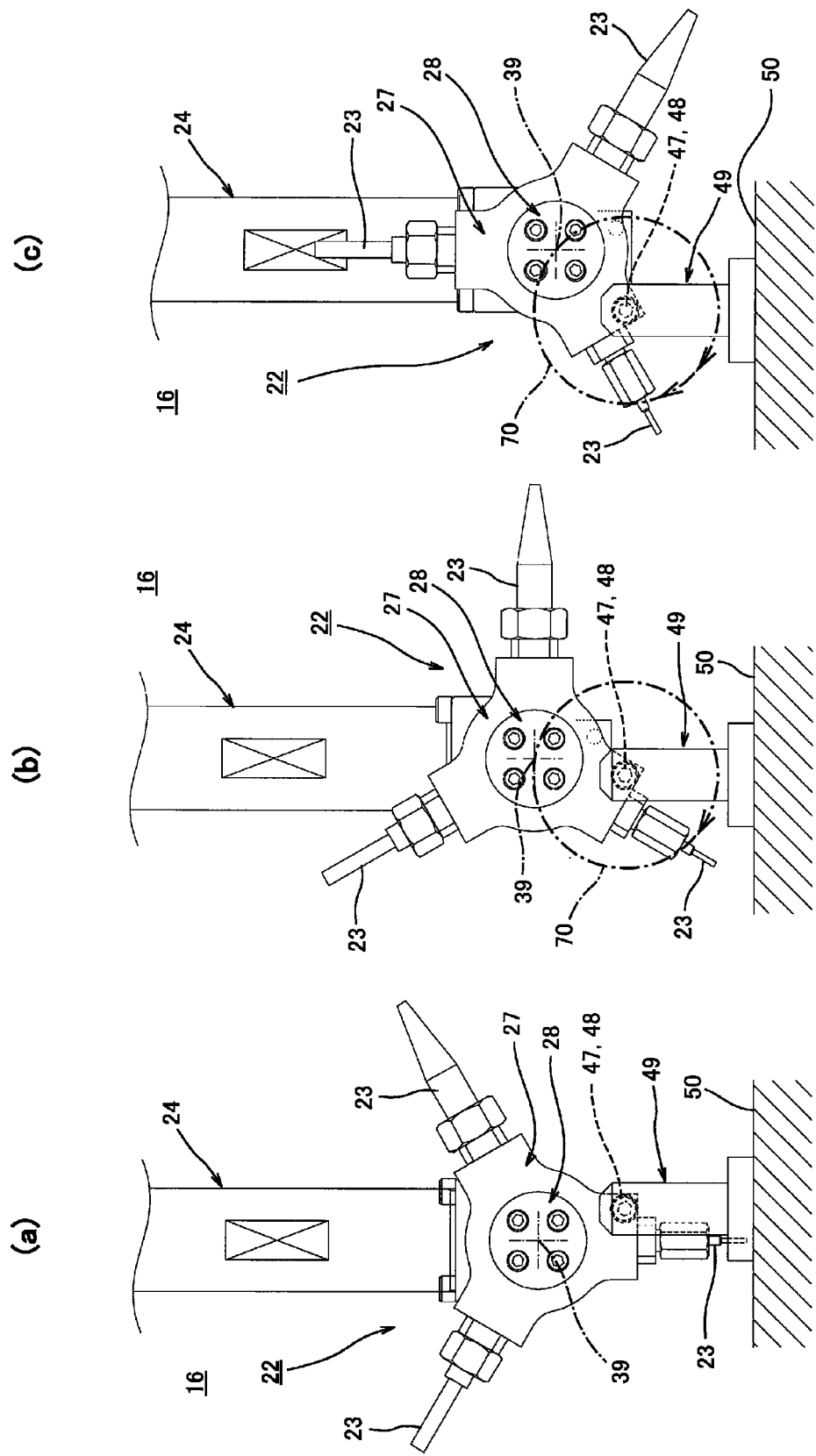
FIG. 7 are diagrams for explaining a procedure of changing the nozzle by using the variable nozzle device according to Embodiment 1.
Figure 8:
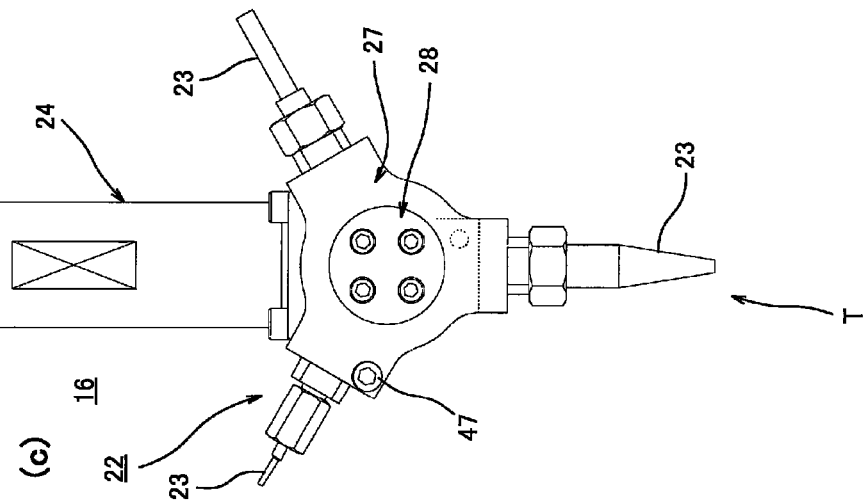
FIG. 8 are diagrams for explaining a procedure of changing the nozzle by using the variable nozzle device according to Embodiment 1.
Figure 8:
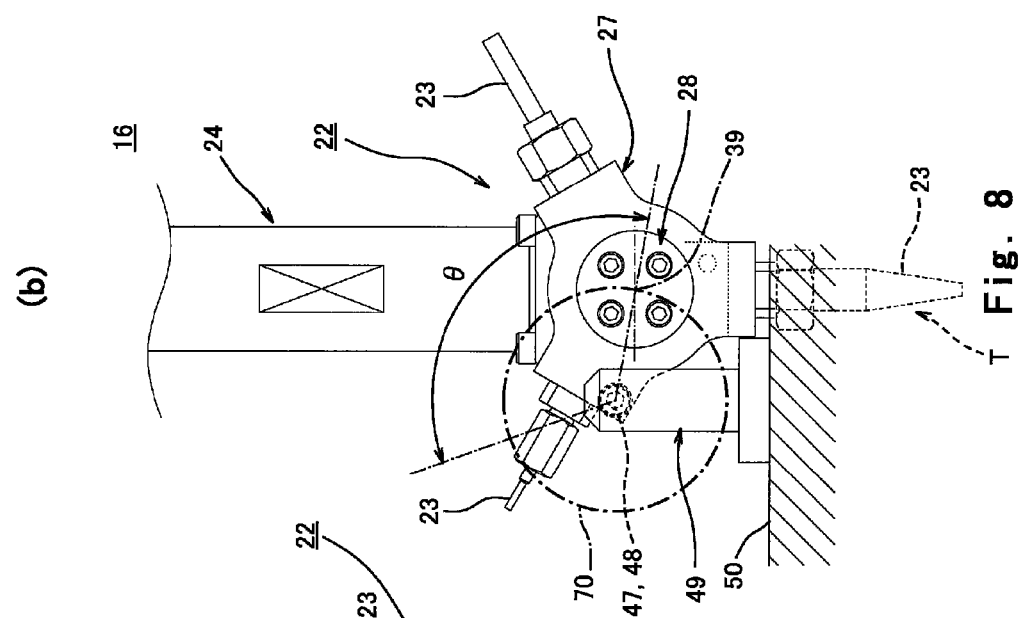
Figure 8:
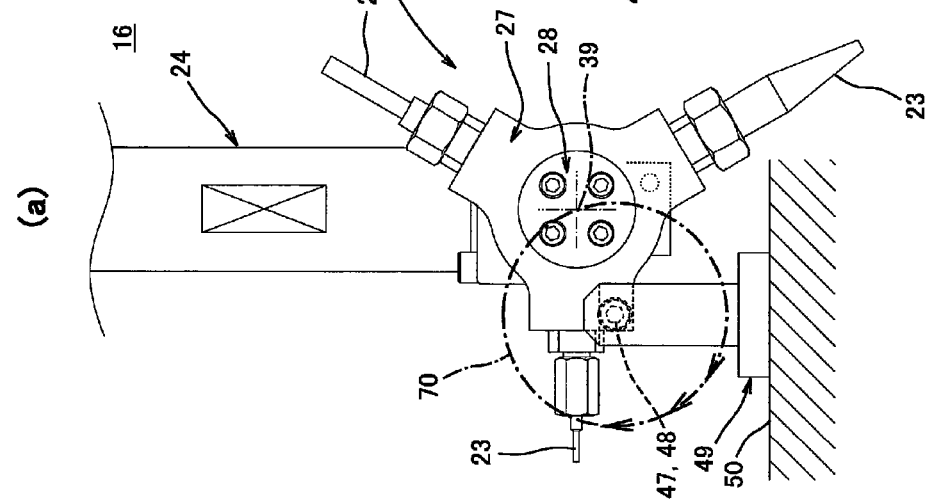

Further, as shown in FIG. 3(b), the engaging portion 47 is the convex portion having a substantially columnar shape, and the engaged portion 48 is the concave portion which can engage with and disengage from the convex portion that is the engaging portion 47 and has a substantially cylindrical shape. By forming the engaging portion 47 and engaged portion 48 having the above shapes, the engaging portion 47 can easily and surely engage with and disengage from the engaged portion 48 by using the nozzle moving drive mechanism, such as the robot arm 19. As shown in FIGS. 7 and 8, in a state where the engaging portion 47 engages with the engaged portion 48, the base portion 28 is rotated about the engaging portion 47 and the engaged portion 48 engaging with each other. Thus, the desired nozzle 23 can be easily moved to the ejection position T.

As shown in FIG. 1, in accordance with the applying device 17, since the ejection pump 24 is attached to the robot arm 19, the outflow opening 24d of the ejection pump 24 can be provided close to the variable nozzle 22. With this, it is possible to reduce a gap between an operation timing of the ejection pump 24 and an ejection timing of the fluid from the nozzle 23 located at the ejection position T. Therefore, flow rate control can be accurately carried out, and the fluid can be accurately applied to a defined application position.

Next, Embodiment 2 of the variable nozzle device according to the present invention will be explained in reference to FIGS. 9(a), 9(b), and 9(c). A variable nozzle device 51 of Embodiment 2 can be used by being attached to the applying device 17 instead of the variable nozzle device 16 of Embodiment 1 shown in FIG. 1.

Figure 9:
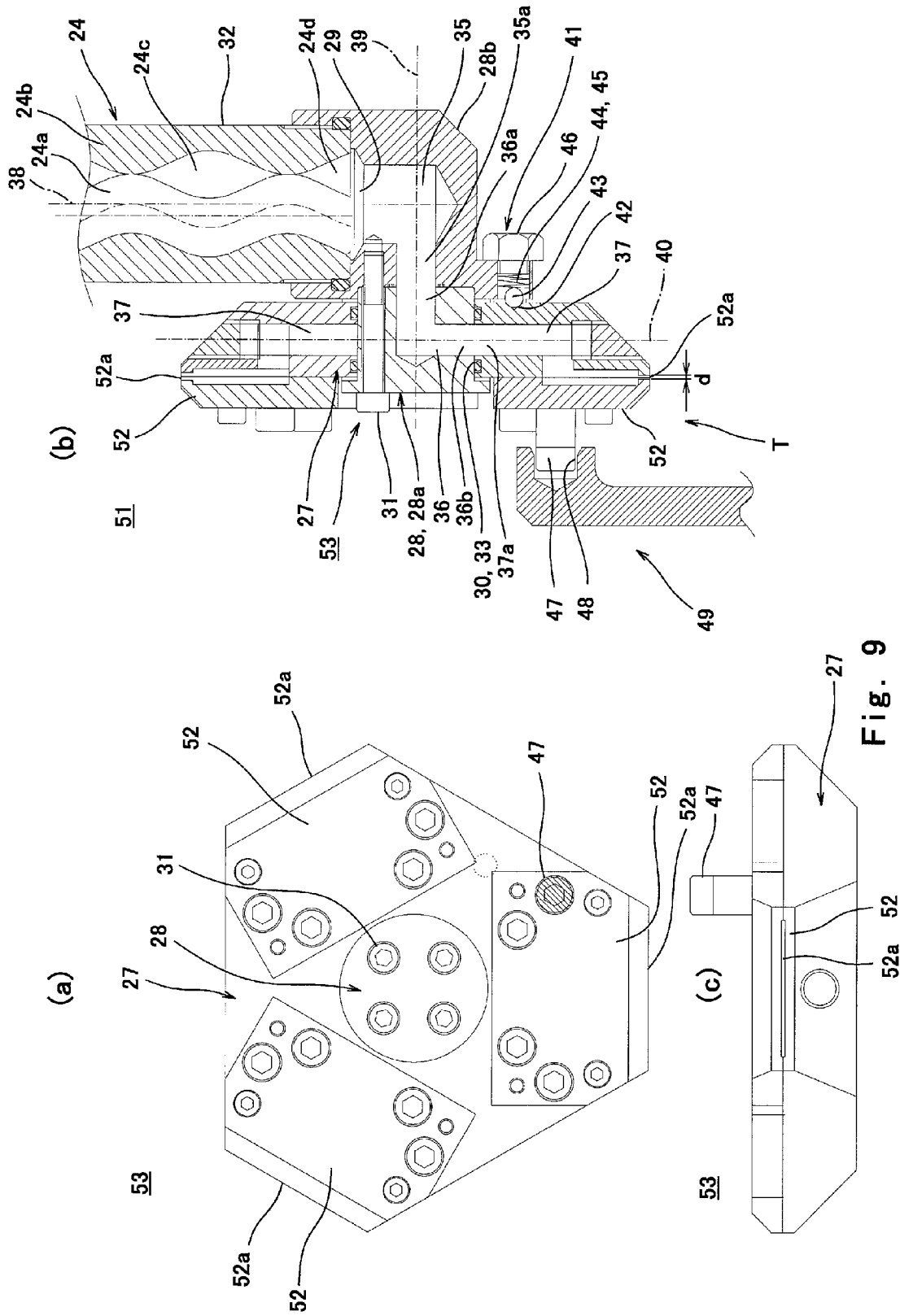
FIG. 9 are diagrams each showing the variable nozzle device according to Embodiment 2 of the present invention.

The variable nozzle device 51 of Embodiment 2 shown in FIGS. 9(a), 9(b), and 9(c) and the variable nozzle device 16 of Embodiment 1 shown in FIGS. 3(a), 3(b), and 3(c) are different from each other in that: in the variable nozzle device 16 of Embodiment 1 shown in FIGS. 3(a), 3(b), and 3(c), the shape of the ejection port 23a of each of the first to third nozzles 23 is a circle; and in the variable nozzle device 51 of Embodiment 2 shown in FIGS. 9(a), 9(b), and 9(c), the shape of an ejection port 52a of each of first to third nozzles 52 is a long and thin rectangle.

Moreover, unlike Embodiment 1, in the variable nozzle device 51 of Embodiment 2, a center axis 40 of each of the third communication passages 37 does not coincide with each of center axes (not shown) of the corresponding first to third nozzles 52. Other than the above, Embodiment 2 is the same as Embodiment 1. The same reference signs are used for the same components, and explanations thereof are omitted.

Since the shape of the ejection port 52a of each of the first to third nozzles 52 included in a variable nozzle 53 shown in FIGS. 9(a), 9(b), and 9(c) is a long and thin rectangle, the fluid can be applied in a band shape to the application surface 21a. Thickness-direction sizes d of the ejection ports 52a of the first to third nozzles 52 are large, medium, and small. With this, thicknesses of band-shaped applied bodies formed on the application surface 21a by the fluids ejected from the first to third nozzles 52 become large, medium, and small based on a predefined standard.

Next, Embodiment 3 of the variable nozzle device according to the present invention will be explained in reference to FIG. 10. A variable nozzle device 55 of Embodiment 3 can be used by being attached to the applying device 17 instead of the variable nozzle device 16 of Embodiment 1 shown in FIG. 1.

Figure 10:
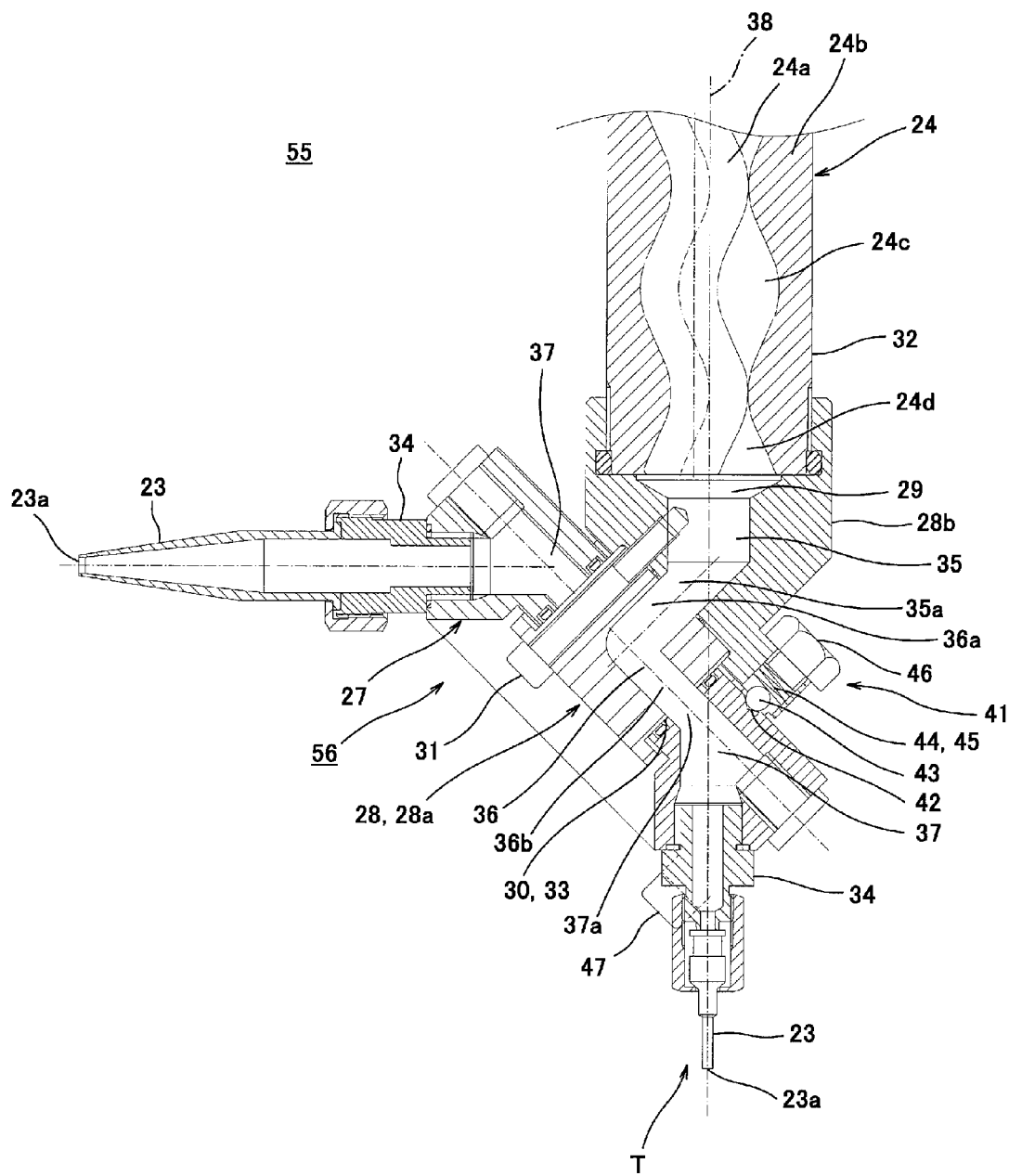
FIG. 10 is an enlarged cross-sectional view of the variable nozzle included in the variable nozzle device according to Embodiment 3 of the present invention.

The variable nozzle device 55 of Embodiment 3 shown in FIG. 10 and the variable nozzle device 16 of Embodiment 1 shown in FIGS. 3(a), 3(b), and 3(c) are different from each other in that: in the variable nozzle device 16 of Embodiment 1 shown in FIGS. 3(a), 3(b), and 3(c), the central axis 40 of the ejection port 23a of the nozzle 23 located at the ejection position T and the central axis 38 of the fluid supply port 29 of the first communication passage 35 (the central axis 38 of the outflow opening 24d of the ejection pump 24) are positioned with a gap K therebetween; and in the variable nozzle device 55 of Embodiment 3 shown in FIG. 10, the central axis 38 of the ejection port 23a of the nozzle 23 located at the ejection position T and the central axis 38 of the fluid supply port 29 of the first communication passage 35 (the central axis 38 of the outflow opening 24d of the ejection pump 24) are positioned on the same straight line or on substantially the same straight line.

With this, when a variable nozzle 56 is attached to the robot arm 19 (nozzle moving drive mechanism), and the nozzle 23 located at the predetermined ejection position T is moved along a defined route of the application surface 21a to apply the fluid to a defined position of the application surface 21a, and even if a large number of variable nozzles 56 having different shapes are provided, it is unnecessary to produce a program for each of the variable nozzles 56 having different shapes, the program causing the robot 20 (nozzle moving drive mechanism) to operate. The program for causing the robot 20 to operate may be produced based on the central axis 38 of the fluid supply port 29. Thus, the program can be produced easily. Of course, the program also can be easily produced by teaching.

Moreover, unlike Embodiment 1, in the variable nozzle device 56 of Embodiment 3, each of the central axes of the first to third nozzles 23 extends in such a direction as to form a predetermined angle with respect to each of the central axes of the third communication passages 37 formed on the rotating portion 27. Other than the above, Embodiment 3 is the same as Embodiment 1. The same reference signs are used for the same components, and explanations thereof are omitted.

Next, Embodiment 4 of the variable nozzle device according to the present invention will be explained in reference to FIG. 11. A variable nozzle device 58 of Embodiment 4 can be used by being attached to the applying device 17 instead of the variable nozzle device 55 of Embodiment 3 shown in FIG. 10.

Figure 11:
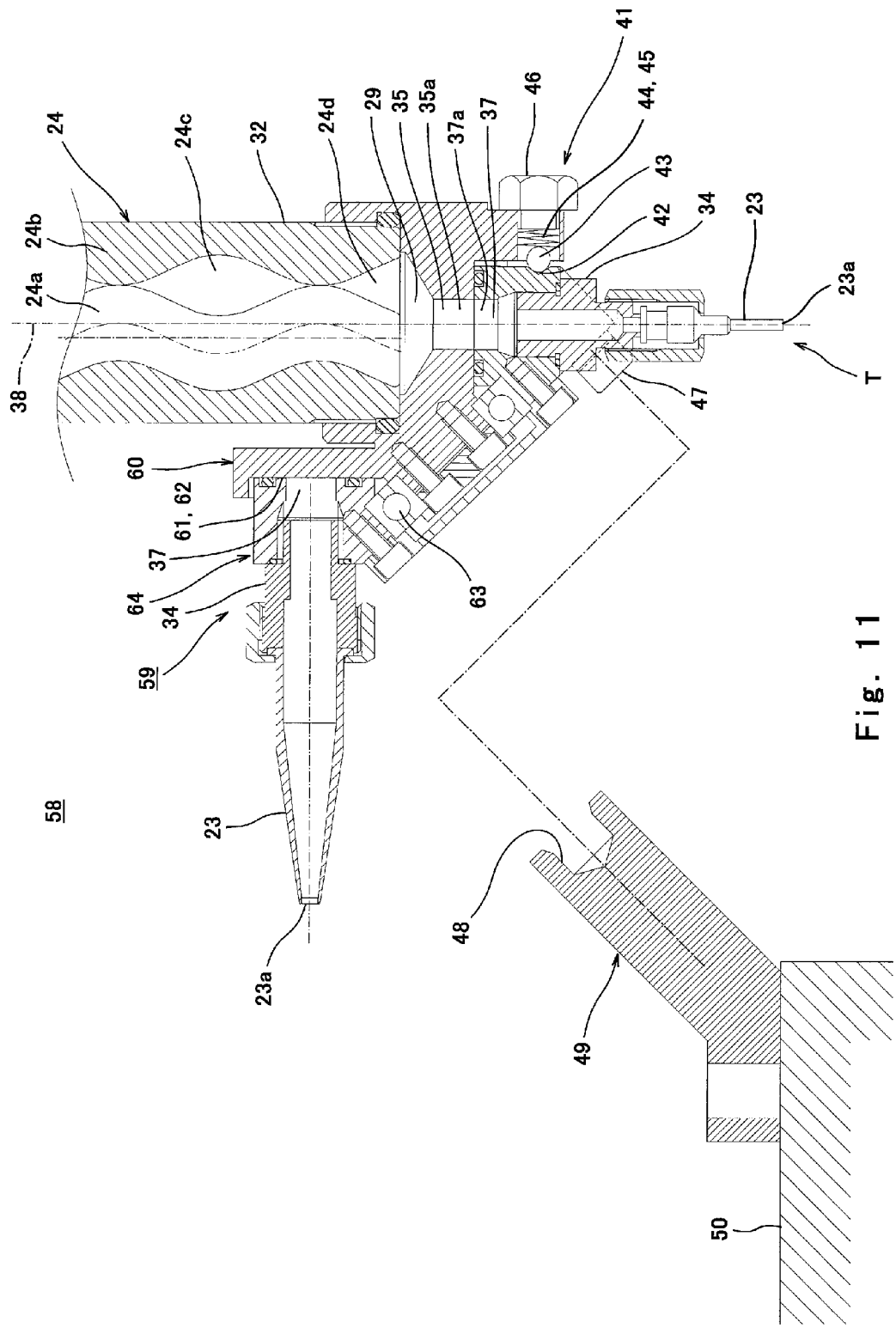
FIG. 11 is an enlarged cross-sectional view of the variable nozzle device according to Embodiment 4 of the present invention.

The variable nozzle device 58 of Embodiment 4 shown in FIG. 11 and the variable nozzle device 55 of Embodiment 3 shown in FIG. 10 are different from each other in that: in the variable nozzle device 55 of Embodiment 3 shown in FIG. 10, the first to third communication passages 35, 36, and 37 formed to cause the inflow opening of the nozzle 23 located at the ejection position T and the fluid supply port 29 of the first communication passage 35 to be communicated with each other are bent; and in the variable nozzle device 58 of Embodiment 4 shown in FIG. 11, the first and third communication passages 35 and 37 formed to cause the inflow opening of the nozzle 23 located at the ejection position T and the fluid supply port 29 of the first communication passage 35 to be communicated with each other are positioned on the same straight line or on substantially the same straight line. In the variable nozzle device 58 of Embodiment 4 shown in FIG. 11, the second communication passage 36 is not formed.

With this, for example, when throwing away the fluid in the first and third communication passages 35 and 37 to wash the variable nozzle 59 included in the variable nozzle device 58, the amount of fluid thrown away can be reduced, which is economical. Since channel resistance of each of the first and third communication passages 35 and 37 can be lowered, the ejection pump 24 configured to cause the fluid to be ejected from the nozzle 23 located at the ejection position T can be reduced in size. In addition, since the first and third communication passages 35 and 37 can be reduced in length, it is possible to reduce the gap between the operation timing of the ejection pump 24 and the ejection timing of the fluid ejected from the nozzle 23 located at the ejection position T. With this, the flow rate control can be accurately carried out, and the fluid can be accurately applied to a defined application position.

Further, the variable nozzle device 58 of Embodiment 4 shown in FIG. 11 and the variable nozzle device 55 of Embodiment 3 shown in FIG. 10 are different from each other as below. To be specific, in the variable nozzle device 55 of Embodiment 3 shown in FIG. 10, the inner peripheral surface 33 formed at the center portion of the annular rotating portion 27 and having a substantially cylindrical shape rotatably fits the outer peripheral surface 30 formed on the base main body 28a and having a substantially cylindrical shape. Meanwhile, in the variable nozzle device 58 of Embodiment 4 shown in FIG. 11, an inner side surface 62 formed at a center portion of an annular rotating portion 64 and having a substantially truncated cone shape rotatably fits an outer side surface 61 formed on a base portion 60 and having a substantially truncated cone shape.

In the variable nozzle device 58 of Embodiment 4, the first and third communication passages 35 and 37 formed to cause the inflow opening of the nozzle 23 located at the ejection position T and the fluid supply port 29 to be communicated with each other are formed to extend through the outer side surface 61 formed on the base portion 28 and the inner side surface 62 formed on the rotating portion 64. Moreover, the rotating portion 64 is rotatably attached to the base portion 60 via a bearing portion 63.

As above, in a case where the first and third communication passages 35 and 37 are formed to extend through the annular outer side surface 61 formed on the base portion 60 and having a substantially truncated cone shape and the annular inner side surface 62 formed on the rotating portion 64 and having a substantially truncated cone shape, a design for providing the outer side surface 61 of the base portion 60 and the inner side surface 62 of the rotating portion 64 between the inflow opening of the nozzle 23 located at the ejection position T and the fluid supply port 29 becomes easy. With this, the central axis 38 of the ejection port 23a of the nozzle 23 located at the ejection position T and the central axis 38 of the fluid supply port 29 can be easily positioned on the same straight line or on substantially the same straight line, and the first and third communication passages 35 and 37 can be easily positioned on the same straight line or on substantially the same straight line.

Other than the above, Embodiment 4 is the same as Embodiment 3. The same reference signs are used for the same components, and explanations thereof are omitted.

Figure 12:
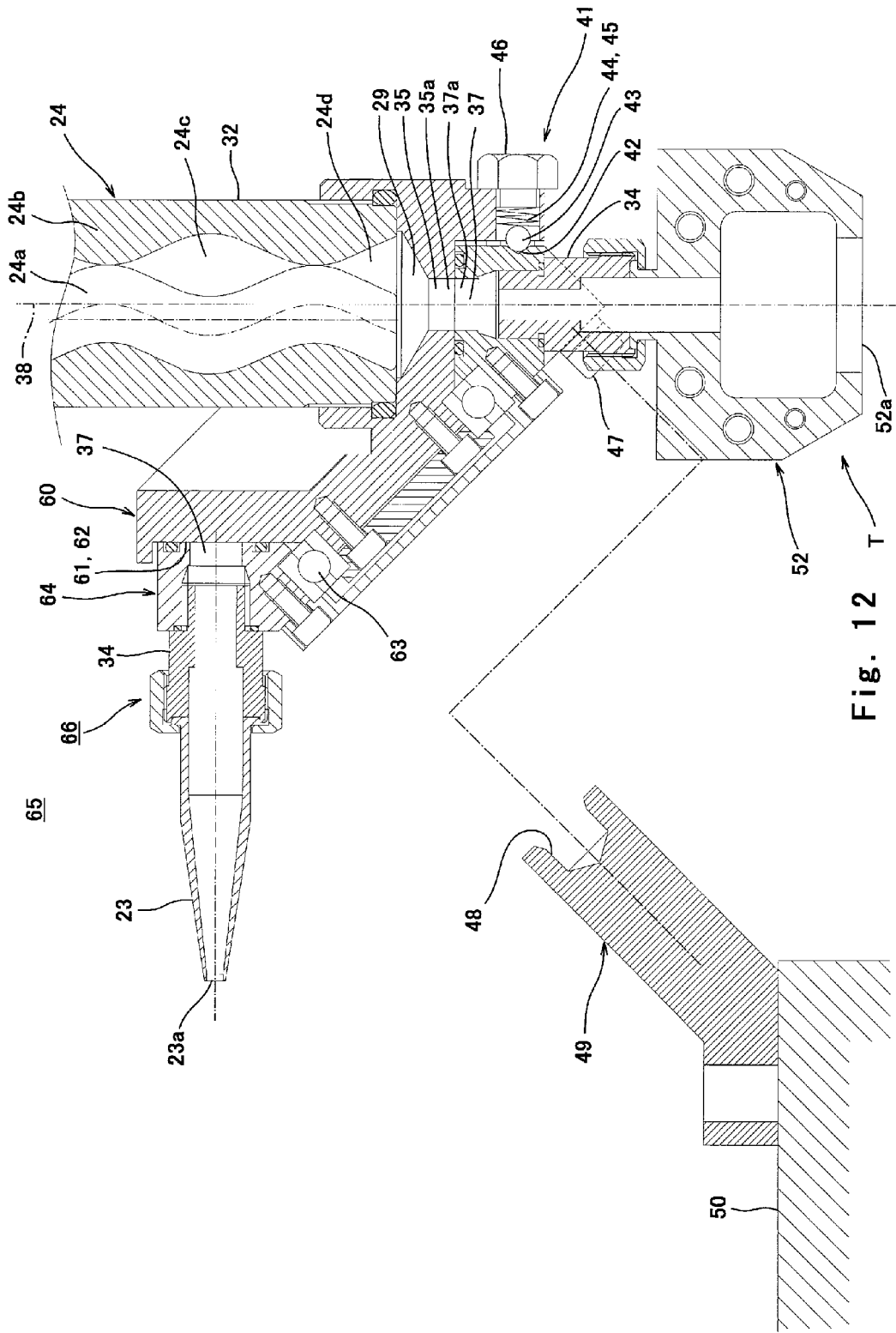
FIG. 12 is an enlarged cross-sectional view of the variable nozzle device according to Embodiment 5 of the present invention.

Next, Embodiment 5 of the variable nozzle device according to the present invention will be explained in reference to FIG. 12. A variable nozzle device 65 of Embodiment 5 shown in FIG. 12 is configured such that in the variable nozzle device 58 of Embodiment 4 shown in FIG. 11, the third nozzle 52 having the long and thin rectangular ejection port 52a is attached instead of the third nozzle 23 having the small circular ejection port 23a, and a variable nozzle 66 is included. The third nozzle 52 having the long and thin rectangular ejection port 52a is the same as the third nozzle 52 attached to the variable nozzle device 51 of Embodiment 2 shown in FIG. 9(b).

With this, the linear applied line and the band-shaped applied body can be formed on the application surface 21a of the component 21 without replacing the nozzles 23 and 52 with respect to the ejection pump 24. Therefore, the efficiency of the application operation can be improved.

Other than the above, Embodiment 5 is the same as Embodiment 4. The same reference signs are used for the same components, and explanations thereof are omitted.

Figure 13:
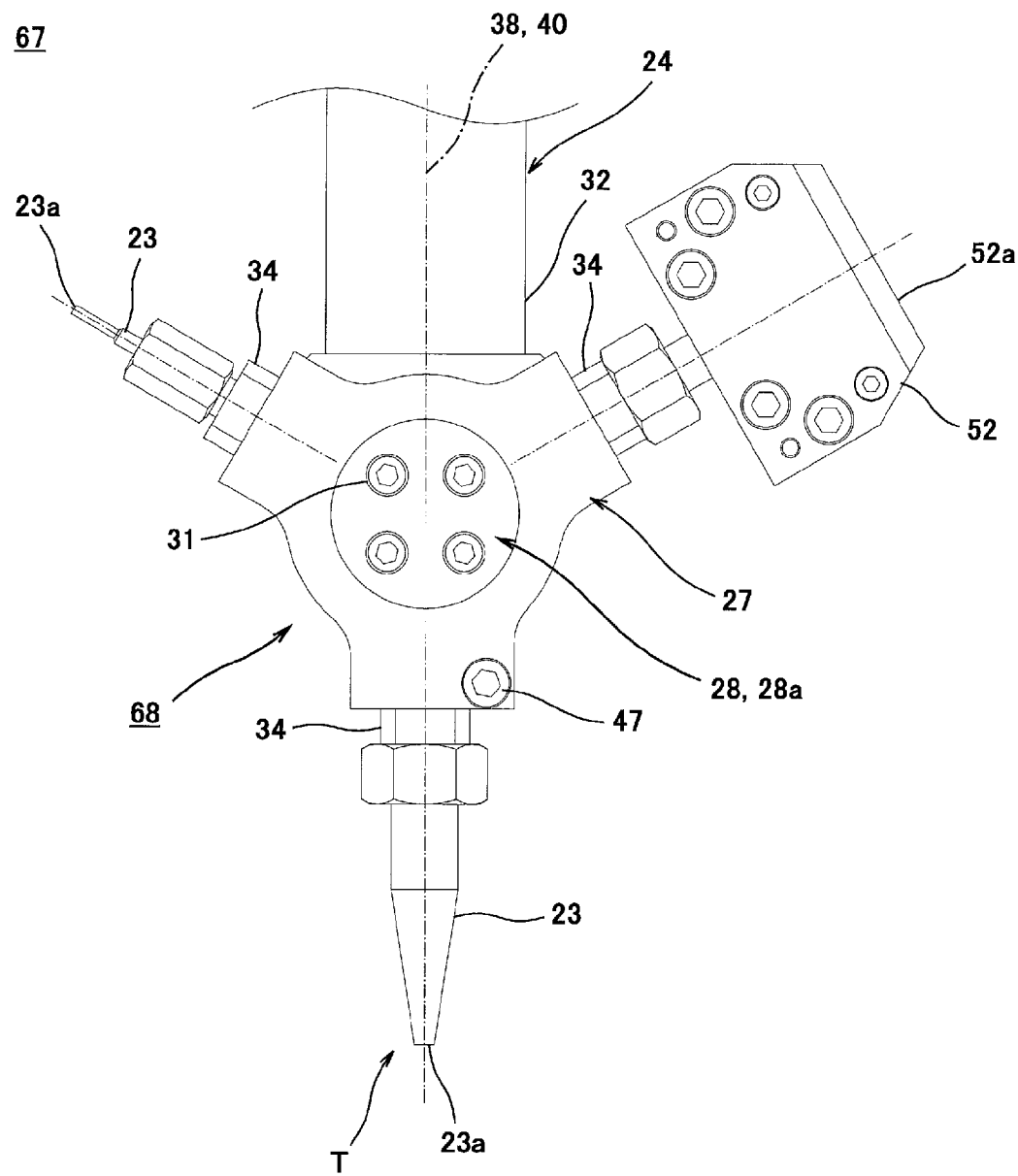
FIG. 13 is an enlarged front view of the variable nozzle included in the variable nozzle device according to Embodiment 6 of the present invention.

FIG. 13 shows Embodiment 6 of the variable nozzle device according to the present invention. A variable nozzle device 67 of Embodiment 6 is configured such that in the variable nozzle device 16 of Embodiment 1 shown in FIG. 3(a), the first nozzle 52 having the long and thin rectangular ejection port 52a is attached instead of the first nozzle 23 having the large circular ejection port 23a, and a variable nozzle 68 is included. The first nozzle 23 having the long and thin rectangular ejection port 52a is the same as the first nozzle 52 attached to the variable nozzle device 51 of Embodiment 2 shown in FIG. 9(a) and having the large ejection port 52a.

With this, the linear applied line and the band-shaped applied body can be formed on the application surface 21a of the component 21 without replacing the nozzles 23 and 52 with respect to the ejection pump 24. Therefore, the efficiency of the application operation can be improved.

Other than the above, Embodiment 6 is the same as Embodiment 1. The same reference signs are used for the same components, and explanations thereof are omitted.

Next, Embodiment 7 of the variable nozzle, the variable nozzle device, and the applying device according to the present invention will be explained in reference to FIGS. 14 to 16. A variable nozzle device 73 of Embodiment 7 can be used by being attached to the applying device 17 instead of the variable nozzle device 16 of Embodiment 1 shown in FIG. 1.

The variable nozzle device 73 of Embodiment 7 shown in FIG. 14 and the variable nozzle device 16 of Embodiment 1 shown in FIG. 3 are different from each other as below.

To be specific, the variable nozzle device 16 of Embodiment 1 shown in FIG. 3 is configured such that: a desired one of the first, second, and third nozzles 23 is selected (this nozzle is selected by a command of a program); the selected desired nozzle 23 is moved to the predetermined ejection position T (lower position); and the fluid can be ejected from the desired nozzle 23 moved to the ejection position T.

Figure 14:
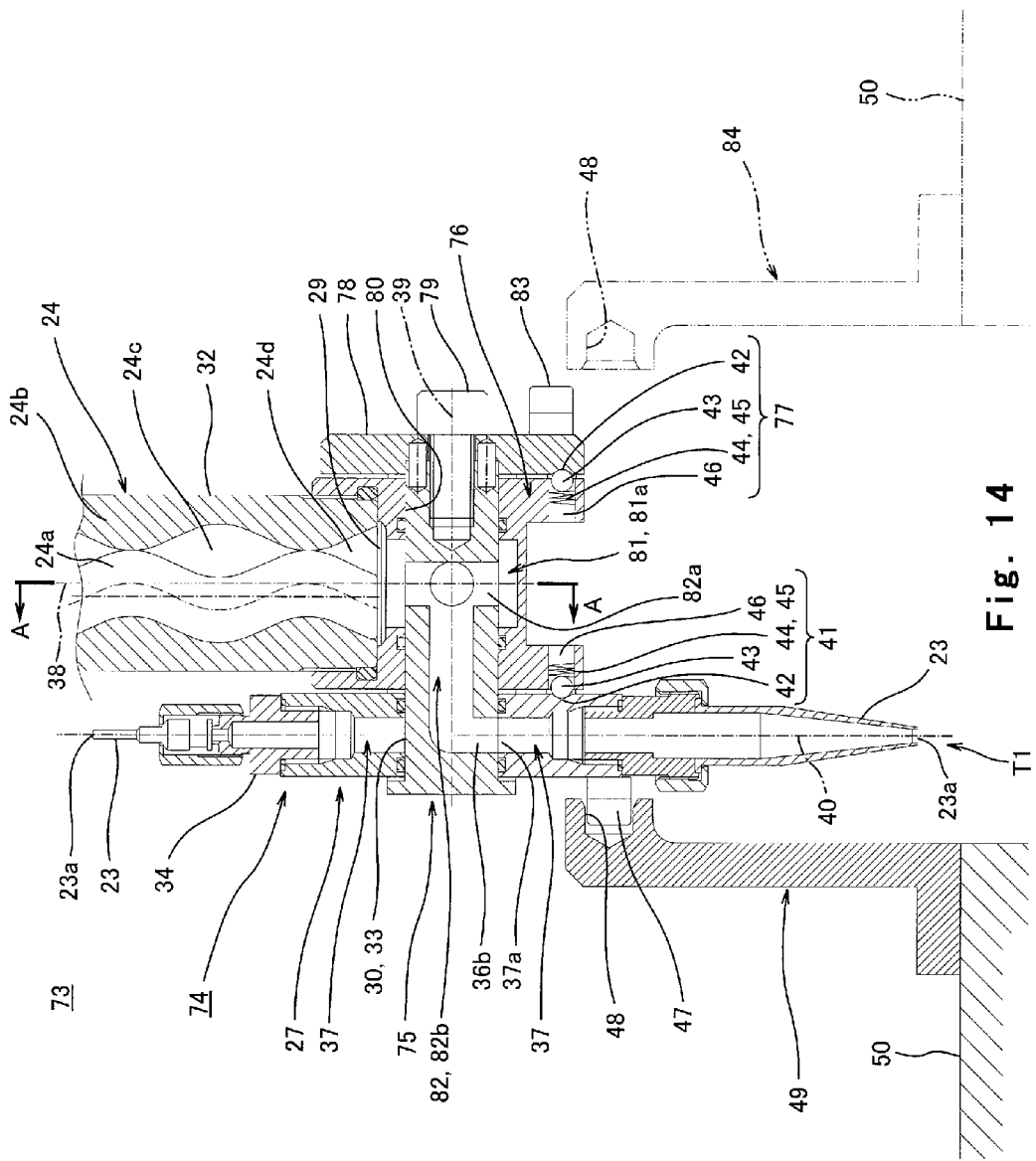
FIG. 14 is an enlarged cross-sectional view of the variable nozzle device according to Embodiment 7 of the present invention.
Figure 15:
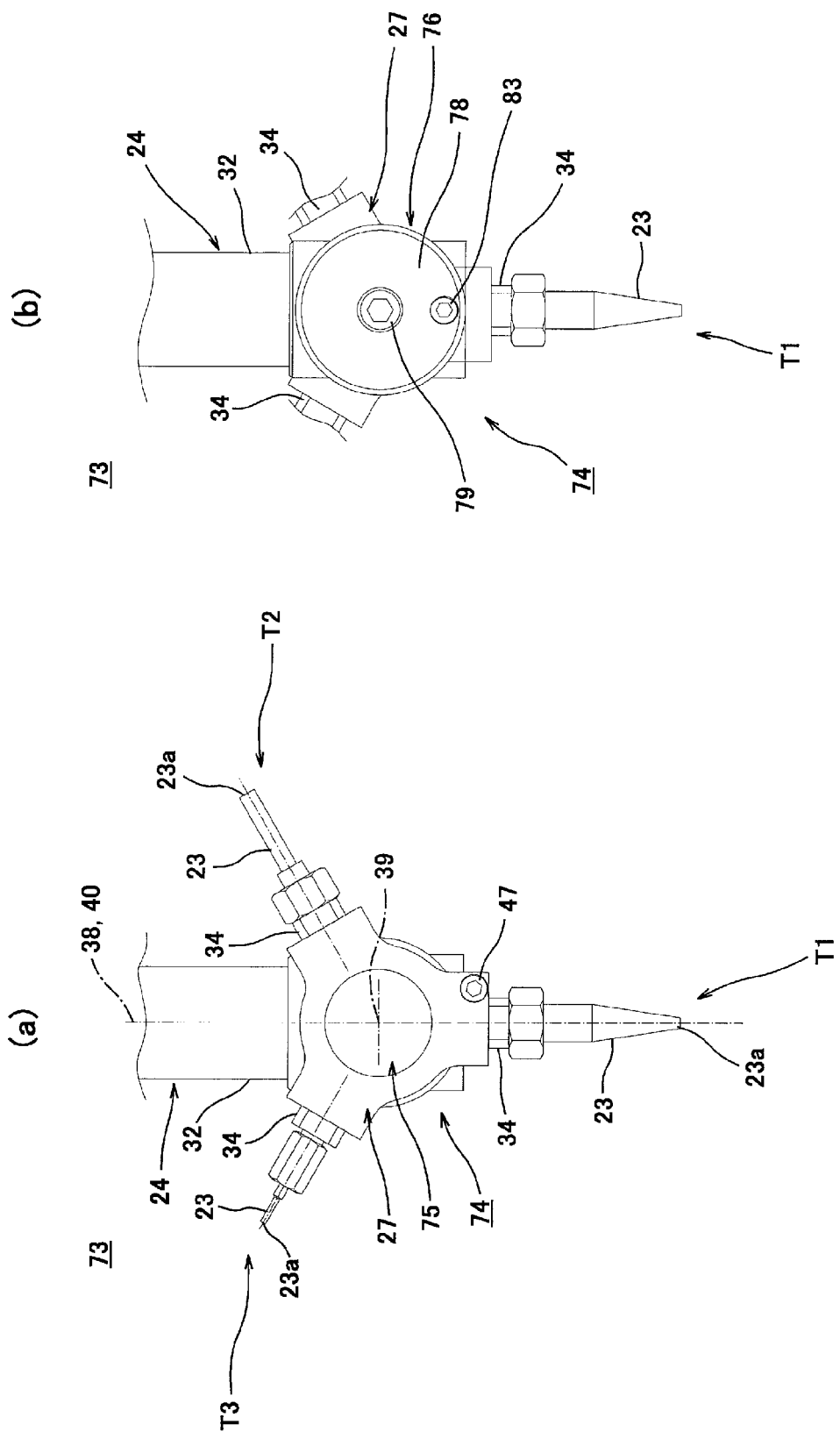
FIG. 15 show the variable nozzle included in the variable nozzle device according to Embodiment 7.

Meanwhile, in the variable nozzle device 73 of Embodiment 7 shown in FIGS. 14 and 15, a plurality of ejection positions, such as first, second and third ejection positions T1, T2, and T3 shown in FIG. 15(a), are defined. The variable nozzle device 73 of Embodiment 7 is configured such that: a desired one of the first, second, and third nozzles 23 is selected; the selected desired nozzle 23 is moved to a desired one of the predetermined ejection positions T1, T2, and T3; and the fluid can be ejected from the desired nozzle 23 moved to the desired ejection position. This is the difference between Embodiments 1 and 7.

Other than the above, Embodiment 7 is the same as Embodiment 1. The same reference signs are used for the same components, and explanations thereof are omitted.

As shown in FIGS. 14 and 15, as with Embodiment 1, a variable nozzle 74 of Embodiment 7 includes: the rotating portion 27 to which the first, second, and third nozzles 23 are attached; a base main body 75 configured to rotatably support the rotating portion 27; and a joint block (base frame) 76 configured to rotatably support the base main body 75.

To eject the fluid, supplied from the fluid supply port 29 of the joint block 76, from a desired one (for example, the second nozzle 23 shown in FIG. 14) of the first to third nozzles 23, the variable nozzle 74 is configured such that: the desired nozzle 23 is moved to a desired one (for example, the lower position T1 shown in FIG. 14) of the predetermined ejection positions T1, T2, and T3; and the fluid can be ejected from the desired nozzle (for example, the second nozzle 23 shown in FIG. 14) moved to the desired ejection position T1.

As shown in FIG. 15(a), the predetermined ejection positions T1, T2, and T3 are defined around the central axis 39 of the base main body 75 at 120° intervals. That is, T1 denotes a position at which the nozzle 23 faces in the vertically lower direction, T2 denotes a position which is away from T1 in a counterclockwise direction by 120°, and T3 denotes a position which is away from T1 in a clockwise direction by 120°.

In Embodiment 7, the ejection positions T1, T2, and T3 are defined. However, a plurality of ejection positions may be further defined. The ejection positions T1, T2, and T3 are defined at even intervals by 120°. However, the ejection positions may be defined at different intervals. These ejection positions can be defined by the below-described first and second lock mechanism 41 and 77 and a program stored in the calculating control portion.

As shown in FIG. 14, the base main body 75 included in the variable nozzle 74 has a substantially columnar shape, and the rotating portion 27 externally and rotatably fits a tip end portion of the base main body 75. The joint block 76 externally and rotatably fits a center portion of the base main body 75. A circular plate member 78 is fixedly attached to a rear end surface of the base main body 75 with a bolt 79. The joint block 76 threadedly engages with the outflow opening portion 32 of the ejection pump 24.

As shown in FIG. 14, the rotating portion 27 and first to third nozzles 23 included in the variable nozzle 74 and an attachment structure between the rotating portion 27 and the base main body 75 are the same as those in Embodiment 1, so that explanations thereof are omitted.

Further, a through hole extending in a horizontal direction is formed at a center portion of the joint block 76 included in the variable nozzle 74. The through hole is formed by an inner peripheral surface 80 having a substantially cylindrical shape. The outer peripheral surface 30 of the base main body 75 rotatably fits the inner peripheral surface 80.

Moreover, as shown in FIG. 14, a first communication passage 81 is formed on the joint block 76, a second communication passage 82 is formed on the base main body 75, and the three third communication passages 37 are formed on the rotating portion 27.

Figure 16:
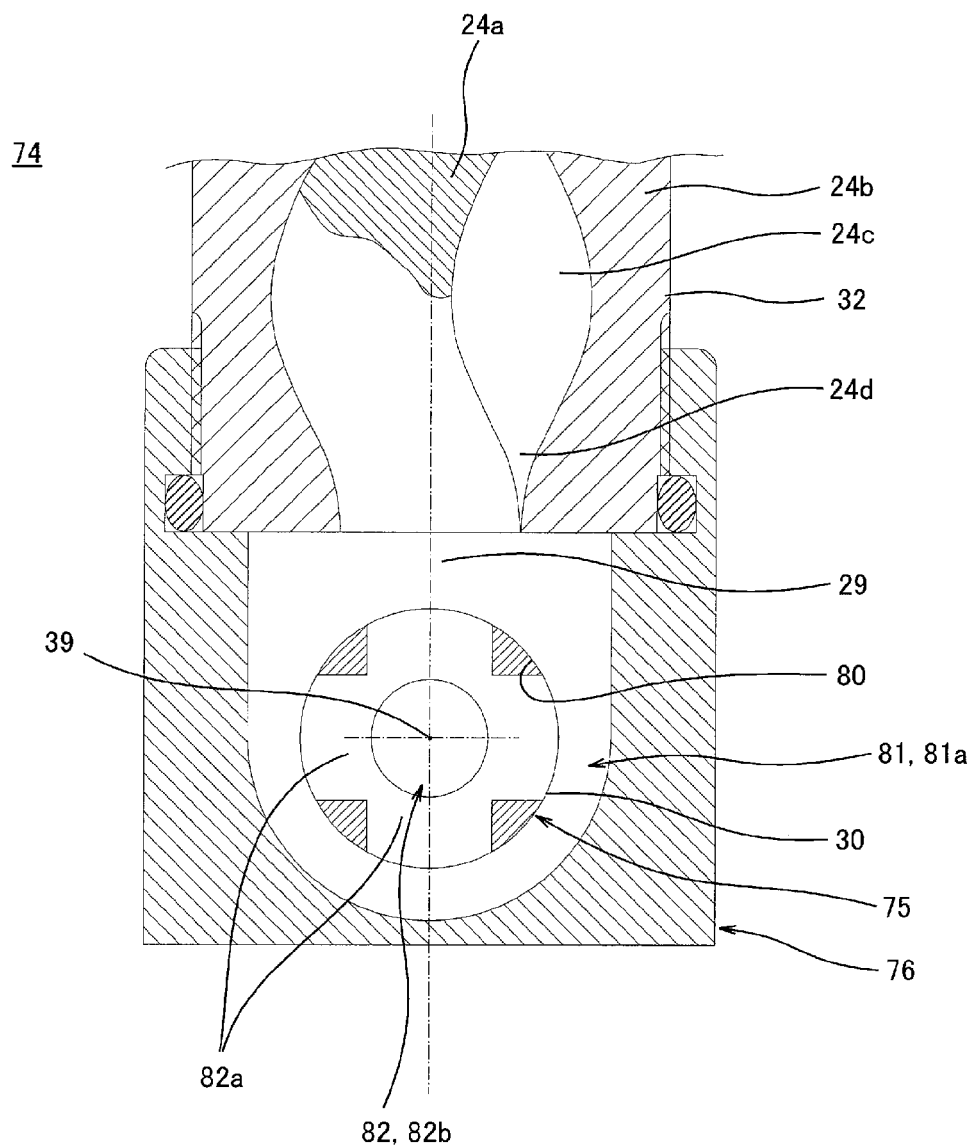
FIG. 16 is an A-A enlarged cross-sectional view of the variable nozzle shown in FIG. 14.
Figure 17:
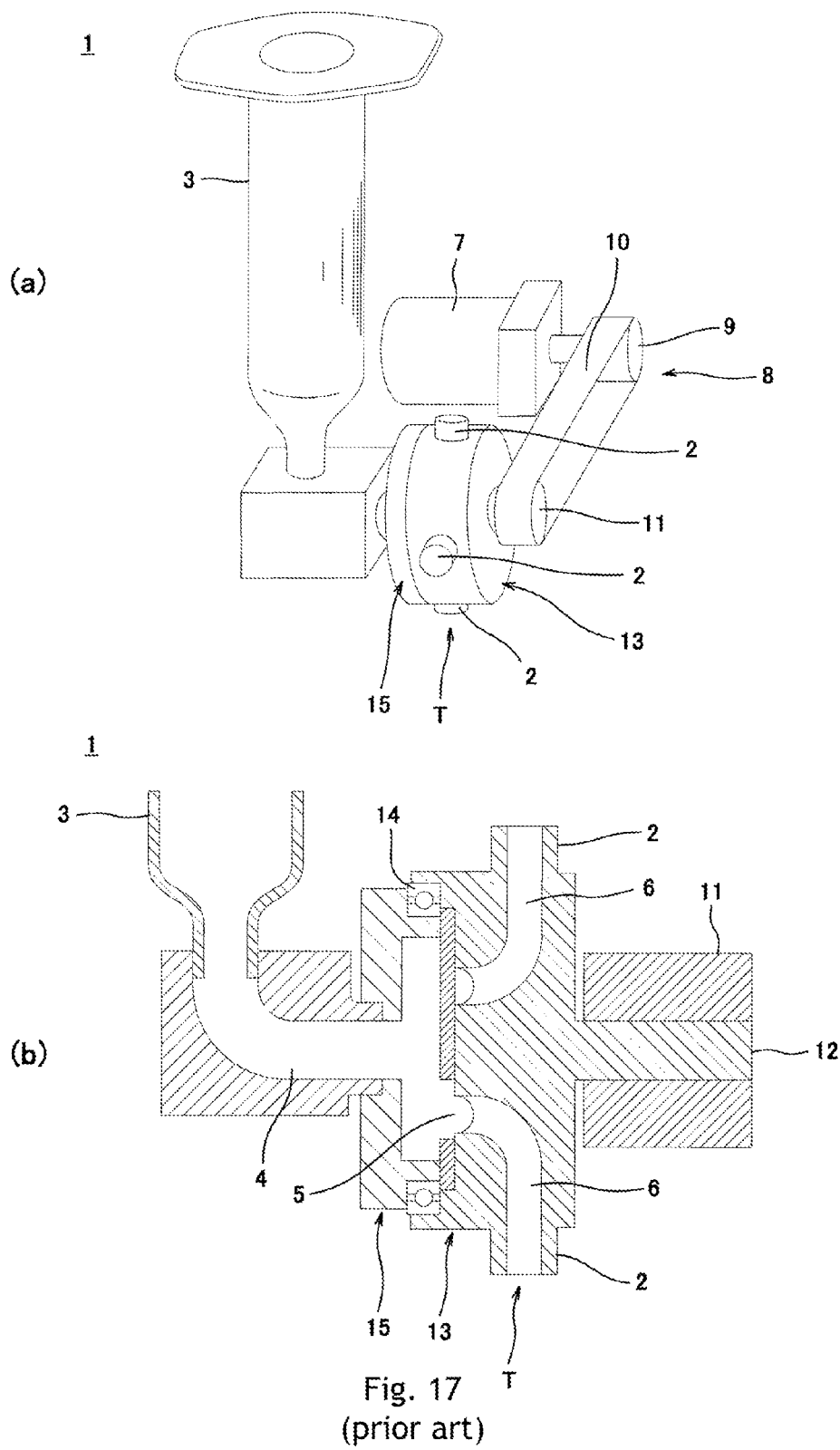
FIG. 17 are diagrams showing one example of a conventional applying device.

As shown in FIGS. 14 and 16, the first communication passage 81 includes the fluid supply port 29, and the fluid supply port 29 is communicated with the outflow opening 24d formed at a lower end portion of the inner hole 24c of the stator 24b. The central axis 38 of the fluid supply port 29 and the central axis 38 of the outflow opening 24d coincide with each other. An outflow opening 81a of the first communication passage 81 is communicated with an inflow opening 82a of the second communication passage 82. The central axis 39 of the second communication passage 82 coincides with a central axis of the base main body 75, and the central axis 39 of the base main body 75 is the central axis of the rotation of the rotating portion 27. Moreover, in the state shown in FIG. 14, the outflow opening 36b of the second communication passage 82 extends in the vertically lower direction and opens on the outer peripheral surface 30 of the base main body 75.

The configuration of the outflow opening 36b of the second communication passage 82 and the configurations of the three third communication passages 37 formed on the rotating portion 27 shown in FIG. 14 are the same as those in Embodiment 1, so that explanations thereof are omitted.

Next, the configuration of the communication between the first communication passage 81 and the second communication passage 82 will be explained in reference to FIGS. 14 and 16. FIG. 16 is a cross-sectional view of the first communication passage 81 shown in FIG. 14 when viewed from an A-A direction. As shown in FIG. 16, the first communication passage 81 formed on the joint block 76 includes the fluid supply port 29 and the outflow opening 81a communicated with the fluid supply port 29. The outflow opening 81a of the first communication passage 81 is an inner peripheral groove having a substantially annular shape and is formed on the inner peripheral surface 80 of the through hole formed on the joint block 76.

As shown in FIG. 16, the second communication passage 82 formed on the base main body 75 includes a radial channel that is the inflow opening 82a and an L-shaped center channel 82b. For example, four inflow openings 82a are formed as the radial channels at 90° intervals along a circumferential direction of the outer peripheral surface 30 of a substantially center portion of the base main body 75 having a substantially columnar shape. An outer end portion of each of these four inflow openings 82a is formed to overlap the outflow opening 81a of the first communication passage 81. An inner end portion of each of these four inflow openings 82a is communicated with the center channel 82b.

The first and second communication passages 81 and 82 are formed as above. Therefore, even when the base main body 75 rotates about the central axis 39 to move to any rotational position, the fluid ejected from the outflow opening 24d of the ejection pump 24 can be supplied to the third communication passage 37 through the fluid supply port 29, the outflow opening 81a (inner peripheral groove) of the first communication passage 81, the inflow opening 82a (radial channel) of the second communication passage 82, and the center channel 82b, and the fluid can be ejected from the nozzle 23.

Next, the first and second lock mechanisms 41 and 77 included in the variable nozzle device 73 shown in FIG. 14 will be explained. The first lock mechanism 41 is the same as the lock mechanism 41 shown in FIG. 3(b), so that an explanation thereof is omitted.

The second lock mechanism 77 shown in FIG. 14 is a mechanism configured to unlockably locks the rotation of the base main body 75 with respect to the joint block 76 when the base main body 75 shown in FIG. 14 rotates about the central axis 39 to move the outflow opening 36b of the second communication passage 82 to the ejection position (communication position) T1, T2, or T3 shown in FIG. 15(a). The second lock mechanism 77 includes the three lock concave portions 42, the lock ball 43, and the spring portion 44, which are the same as those in Embodiment 1.

In FIG. 14, the outflow opening 36b of the second communication passage 82 is moved to the ejection position (communication position) T1, and the outflow opening 36b is communicated with the nozzle 23 having been moved to the ejection position T1.

Therefore, for example, to move a desired one of the first to third nozzles 23 to the ejection position T2 or T3 shown in FIG. 15(a) and eject the fluid from the desired nozzle 23 located at the ejection position, first, the desired nozzle 23 is moved to the ejection position T2 or T3. At this time, the first lock mechanism 41 can stop the nozzle 23 at the ejection position T2 or T3.

Next, the base main body 75 is rotated about the central axis 39 to move the outflow opening 36b of the second communication passage 82 to the ejection position (communication position) T2 or T3. At this time, the second lock mechanism 77 can stop the outflow opening 36b of the second communication passage 82 at the ejection position T2 or T3.

With this, the outflow opening 36b of the second communication passage 82 can be communicated with the nozzle 23 having been moved to the ejection position T2 or T3. In this state, the fluid ejected from the ejection pump 24 can be ejected from the desired nozzle 23 located at the desired ejection position T2 or T3.

Next, the second lock mechanism 77 will be explained. As shown in FIG. 14, the three lock concave portions 42 are formed on an inner surface of the circular plate member 78, the surface facing the joint block 76. The lock ball 43 can engage with and disengage from each of the lock concave portions 42. Further, the three lock concave portions 42 are formed at such positions that the outflow opening 36b of the second communication passage 82 can be locked at each of the ejection positions T1, T2, and T3. Moreover, the lock ball 43 is stored in the storage hole 45 formed on the joint block 76. The spring portion 44 is stored in the storage hole 45.

The spring portion 44 biases the lock ball 43 toward the lock concave portion 42. Repulsive force of biasing force of the spring portion 44 is stopped by the bolt 46. The bolt 46 fixedly and threadedly engages with the storage hole 45.

In accordance with the second lock mechanism 77 shown in FIG. 14, when the spring portion 44 biases the lock ball 43 toward the lock concave portion 42, and the lock ball 43 engages with any one of the lock concave portions 42, the lock ball 43 can stop relative rotation of the circular plate member 78 with respect to the joint block 76. Thus, the outflow opening 36b of the second communication passage 82 can be accurately positioned and stopped at each of the ejection positions T1, T2, and T3, and the outflow opening 36b of the second communication passage 82 at the ejection position T1, T2, or T3 can be unlockably stopped so as not to be displaced from the ejection position. By rotating the base main body 75 against the force of the spring portion 44, the lock ball 43 can be detached from the lock concave portion 42. In this state, the base main body 75 can be easily rotated, and the outflow opening 36b of the second communication passage 82 can be moved to the other ejection position and locked.

The second lock mechanism 77 is configured as shown in FIG. 14. However, instead of this configuration, the lock concave portion 42 may be formed on the joint block 76, the storage hole 45 may be formed on the circular plate member 78, and the lock ball 43, the spring portion 44, and the bolt 46 may be provided on the storage hole 45.

Next, the first and second engaging portions 47 and 83 and the engaged portion 48 included in the variable nozzle device 73 shown in FIG. 14 will be explained. The first engaging portion 47 and the engaged portion 48 are respectively the same as the engaging portion 47 and the engaged portion 48 shown in FIG. 3(b), so that explanations thereof are omitted.

The second engaging portion 83 shown in FIG. 14 is used in the same manner as the engaging portion 47 shown in FIG. 3 and can cause the outflow opening 36b of the second communication passage 82 to be moved to a desired one of the ejection positions T1, T2, and T3. The variable nozzle 74, the first and second engaging portions 47 and 83, and the engaged portion 48 constitute the variable nozzle device 73.

As shown in FIGS. 14 and 15(b), the second engaging portion 83 is a substantially columnar convex portion having the same shape and size as the first engaging portion 47. The second engaging portion 83 can engage with and disengage from the engaged portion 48. The second engaging portion 83 is provided on an outer surface of the circular plate member 78. When the outflow opening 36b of the second communication passage 82 is located at the ejection position T1, the second engaging portion 83 is located at a position away from the central axis 39 of the rotation of the rotating portion 27 and immediately below the central axis 39 of the rotation of the rotating portion 27.

As shown in FIG. 14, the second engaging portion 83 is attached to the outer surface of the circular plate member 78, the outer surface being located on the opposite side of an outer surface of the rotating portion 27 to which the first engaging portion 47 is attached. Therefore, to cause the second engaging portion 83 to engage with the engaged portion 48 of the engaged member 49 provided on the mounting base 50, the second engaging portion 83 needs to be caused to face the engaged portion 48.

In this case, by turning the tip end portion of the robot arm 19 about a vertical line by 180°, the second engaging portion 83 can face the engaged portion 48. Moreover, in the case of operating the second engaging portion 83 without turning the tip end portion of the robot arm 19 by 180°, as shown by chain double-dashed lines in FIG. 14, a second engaged member 84 including the second engaged portion 48 for operating the second engaging portion 83 may be provided on the mounting base 50 in addition to the engaged member (first engaged member) 49 of the engaged portion (first engaged portion) 48. The second engaged portion 48 is provided so as to face the first engaged portion 48.

As shown in FIG. 14, the second engaging portion 83 is formed as the convex portion, and the engaged portion 48 is formed as the concave portion. However, instead of this, the second engaging portion may be formed as the concave portion, and the engaged portion may be formed as the convex portion.

Next, a procedure of applying the fluid, such as the damping agent, to the surface of, for example, the component 21 of the automobile shown in FIG. 1 by using the applying device configured as above and the actions of the applying device will be explained. As with Embodiment 1 shown in FIG. 1, the ejecting device of Embodiment 7 is attached to the tip end portion of the multijoint robot arm 19. As shown in FIG. 14, among the first to third nozzles 23 in the variable nozzle 74 included in the ejecting device, the second nozzle 23 whose ejection port 23a has the medium diameter is set at the ejection position T1.

In this state, as with Embodiment 1, the fluid can be applied by the second nozzle 23 to the application surface 21a of, for example, the upper surface of the component 21 of the predetermined automobile. The applied line formed by the fluid ejected from the second nozzle 23 is the medium line.

Next, a procedure of, for example, further forming the thick applied line by using the first nozzle 23 whose ejection port 23a has the large diameter on the application surface (not shown) of an inner lower surface of the component 21 of the automobile on which the medium applied line is formed by using the second nozzle 23 will be explained. To be specific, as shown in FIGS. 14 and 15, the second nozzle 23 of the variable nozzle 74 is located at the ejection position T1, and the outflow opening 36b of the second communication passage 82 formed on the base main body 75 is located at the ejection position T1. Although not shown, a procedure of moving the first nozzle 23 to the ejection position T3 and moving the outflow opening 36b of the second communication passage 82 to the ejection position T3 from the above state will be explained.

First, the first nozzle 23 is moved to the ejection position T3 by using the same method as in Embodiment 1. To be specific, as shown in FIG. 14, by operating the robot arm 19, the first engaging portion 47 provided at the variable nozzle 74 engages with the engaged portion 48 of the engaged member 49 attached to the mounting base 50.

By operating the robot arm 19, the base main body 75 is moved in a predetermined direction by θ (=120°) along the circumference 70 whose center is each of the first engaging portion 47 and the engaged portion 48 engaging with each other. With this, the first nozzle 23 whose ejection port 23a has the large diameter can be moved to the ejection position T3.

Here, when the first nozzle 23 located at the ejection position T2 is moved to the ejection position T3, the rotating portion 27 rotates about the stopped base main body 75. The base main body 75 is configured not to rotate in the same direction as the rotating portion 27 at this time. This configuration is realized by the second lock mechanism 77. The second lock mechanism 77 causes the base main body 75 to engage with the joint block 76 to stop the base main body 75. Therefore, engaging force between the base main body 75 and the joint block 76 engaging with each other by the second lock mechanism 77 is set to be larger than frictional resistance between the rotating portion 27 and the base main body 75.

Next, the outflow opening 36b of the second communication passage 82 is moved to the ejection position T3 by using the same method as in Embodiment 1. To be specific, by operating the robot arm 19, the first engaging portion 47 shown in FIG. 14 is separated from the engaged portion 48. Then, by turning the tip end portion of the robot arm 19 by 180°, the second engaging portion 83 faces the engaged portion 48 to engages with the engaged portion 48.

By operating the robot arm 19, the base main body 75 is moved in a direction opposite to the predetermined direction by θ (=120°) along a circumference whose center is each of the second engaging portion 83 and the engaged portion 48 engaging with each other. With this, the outflow opening 36b of the second communication passage 82 can be moved to the ejection position T3.

Here, when the outflow opening 36b of the second communication passage 82 is moved from the ejection position T1 to the ejection position T3, the base main body 75 rotates at the center of the stopped rotating portion 27. The rotating portion 27 is configured not to rotate in the same direction as the base main body 75 at this time. This configuration is realized by the first lock mechanism 41. The first lock mechanism 41 causes the rotating portion 27 to engage with the joint block 76. Therefore, engaging force between the rotating portion 27 and the joint block 76 engaging with each other by the first lock mechanism 41 is set to be larger than frictional resistance between the rotating portion 27 and the base main body 75.

In this state, the robot arm 19 is moved by a program such that the first nozzle 23 located at the ejection position T3 is moved to the next starting point of the application surface of the inner lower surface of the component 21 of the automobile. Then, the ejection pump 24 is driven, and the ejecting device (variable nozzle 74) is moved by the robot arm 19. Thus, the fluid can be applied to each application surface of the component 21 of the predetermined automobile by using the first nozzle 23.

As above, in accordance with the variable nozzle device 73 shown in FIG. 14, by moving a desired one of the first to third nozzles 23 to the desired ejection position T1, T2, or T3, the applied line that is, for example, the thick line, the medium line, or the thin line can be formed on, for example, the application surface 21a of the component 21 based on a predefined standard. With this, the fluid can be applied to various different portions, such as the upper surface, inner lower surface, and inner and outer side surfaces of the component 21, by causing the nozzle 23 to face those portions.

Therefore, in accordance with the applying device of Embodiment 7, for example, the applied line having a desired thickness can be freely formed on the application surfaces of a complex-shape member, the application surfaces facing in various directions and being formed at various positions. On this account, plural types of application operations can be carried out with extremely high efficiency.

In the above embodiments, as shown in FIG. 3(a), the uniaxial eccentric screw pump is used as the ejection pump 24. However, instead of this, the other type of pump may be used.

In the above embodiments, as shown in FIG. 1, the ejection pump 24 is attached to the tip end portion of the robot arm 19, and the variable nozzle 22 is attached to the outflow opening portion 32 of the ejection pump 24. Instead of this, the ejection pump 24 may be provided at a fixed portion other than the robot arm 19, the variable nozzle 22 may be attached to the tip end portion of the robot arm 19, and the fluid ejected from the ejection pump 24 may be supplied to the fluid supply port 29 of the variable nozzle 22 through a transfer pipe. With this, driving force required by the robot arm 19 can be reduced.

Moreover, in the above embodiments, as shown in FIG. 3(a) for example, the first to third nozzles 23 are attached to the variable nozzle 22. However, two nozzles 23 or four or more nozzles 23 may be attached to the variable nozzle 22.

Further, in the variable nozzle device 55 of Embodiment 3 shown in FIG. 10, the first to third communication passages 35, 36, and 37 formed to cause the inflow opening of the nozzle 23 located at the ejection position T and the fluid supply port 29 of the first communication passage 35 to be communicated with each other are bent. However, instead of this, the first to third communication passages 35, 36, and 37 may be formed as straight communication passages. In this case, the diameter of the base portion 28 needs to be increased.

REFERENCE SIGNS LIST 16, 51, 55, 58, 65, 67, 73 variable nozzle device
17 applying device
18 ejecting device
19 robot arm
20 robot
21 component
21a application surface
22, 53, 56, 59, 66, 68, 74 variable nozzle
23, 52 first nozzle, second nozzle, third nozzle
23a, 52a ejection port
24 ejection pump
24a rotor
24b stator
24c inner hole
24d, 35a, 36b outflow opening
25 rotary driving portion
26 suction port
27, 64 rotating portion
28, 60 base portion
28a base main body
28b, 76 joint block (base frame)
29 fluid supply port
30 outer peripheral surface of base main body
31, 46 bolt
32 outflow opening portion of ejection pump
33 inner peripheral surface of rotating portion
34 adapter
35 first communication passage
36 second communication passage
36a, 37a inflow opening
37 third communication passage
38, 39, 40 central axis
41 lock mechanism (first lock mechanism)
42 lock concave portion
43 lock ball
44 spring portion
45 storage hole
47 engaging portion (first engaging portion)
48 engaged portion (first engaged portion)
49 engaged member (first engaged member)
50 mounting base
61 outer side surface of base 62 inner side surface of rotating portion
63 bearing portion
70 circumference
75 base main body
77 second lock mechanism
78 circular plate member
79 bolt
80 inner peripheral surface of joint block
81 first communication passage
81a outflow opening
82 second communication passage
82a inflow opening
82b center channel
83 second engaging portion
84 second engaged member
T, T1, T2, T3, T4 ejection position

The invention claimed is:

1. A variable nozzle device comprising:
a variable nozzle including a rotating portion to which a plurality of nozzles are attached and a base portion configured to rotatably support the rotating portion, the variable nozzle being capable of moving a desired one of the plurality of nozzles to a predetermined ejection position to eject a fluid from the desired nozzle, the fluid being supplied from a fluid supply port of the base portion;
an engaging portion provided at the rotating portion;
an engaged portion provided at a fixed portion to engage with and disengage from the engaging portion, wherein the desired nozzle is moved to the ejection position by moving the base portion with the engaging portion engaging with the engaged portion.

2. The variable nozzle device according to claim 1, wherein a central axis of an ejection port of the nozzle located at the ejection position and a central axis of the fluid supply port are positioned on the same straight line or on substantially the same straight line.

3. The variable nozzle device according to claim 1 or 2, wherein a communication passage formed to cause an inflow opening of the nozzle located on the ejection position and the fluid supply port to be communicated with each other is formed on a straight line or on a substantially straight line.

4. The variable nozzle device according to claim 1, wherein:
the base portion includes an outer peripheral surface having a substantially cylindrical shape or an annular outer side surface having a substantially truncated cone shape;
an inner peripheral surface having a substantially cylindrical shape or an inner side surface having a substantially truncated cone shape is provided on the rotating portion so as to be rotatable and opposed to the outer peripheral surface or the outer side surface; and
a communication passage formed to cause an inflow opening of the nozzle located at the ejection position and the fluid supply port to be communicated with each other extends through the outer peripheral surface of the base portion and the inner peripheral surface of the rotating portion, or the communication passage extends through the outer side surface of the base portion and the inner side surface of the rotating portion.

5. The variable nozzle device according to claim 1, wherein the engaging portion is a convex portion or a concave portion, and the engaged portion is a concave portion or a convex portion which is able to engage with and disengage from the engaging portion that is the convex portion or the concave portion.

6. The variable nozzle device according to claim 1, further comprising a lock mechanism configured to unlockably lock rotation of the rotating portion with respect to the base portion when each of the plurality of nozzles is moved to the ejection position, wherein
the lock mechanism includes: a plurality of lock concave portions formed at one of the rotating portion and the fixed portion; a lock ball provided at the other one of the rotating portion and the fixed portion to engage with each of the lock concave portions; and a spring portion configured to bias the lock ball toward the lock concave portion.

7. An applying device comprising: the variable nozzle device according to claim 1; a pump configured to supply the fluid to the fluid supply port of the variable nozzle; and a robot arm to which the pump and the variable nozzle are attached.

8. A variable nozzle comprising:
a rotating portion to which a plurality of nozzles are attached;
a base main body configured to rotatably support the rotating portion; and
a base frame configured to rotatably support the base main body, wherein:
the rotating portion is able to move a desired one of the plurality of nozzles to a desired ejection position to eject a fluid from the desired nozzle, the fluid being supplied from a fluid supply port of the base frame; and
the base main body is able to move a communication passage to a predetermined communication position to cause the fluid supply port of the base frame and the desired nozzle located at the desired ejection position to be communicated with each other, the communication passage being formed on the base main body.

9. A variable nozzle device comprising:
the variable nozzle according to claim 8;
a first engaging portion provided at the rotating portion;
a second engaging portion provided at the base main body; and
an engaged portion provided at a fixed portion to engage with and disengage from each of the first engaging portion and the second engaging portion, wherein:
the desired nozzle is able to be moved to the desired ejection position by moving the base main body with the first engaging portion engaging with the engaged portion; and
the communication passage is able to be moved to a desired communication position by moving the base main body with the second engaging portion engaging with the engaged portion.

10. The variable nozzle device according to claim 9, wherein the engaged portion is constituted by one engaged portion configured to engage with and disengage from each of the first engaging portion and the second engaging portion, or the engaged portion is constituted by two engaged portions that are a first engaged portion configured to engage with and disengage from the first engaging portion and a second engaged portion configured to engage with and disengage from the second engaging portion.

11. An applying device comprising:
the variable nozzle device according to claim 9 or 10;
a pump configured to supply the fluid to the fluid supply port of the variable nozzle; and
a robot arm to which the pump and the variable nozzle are attached.

* * * * *